United States Patent
Dennis et al.

(10) Patent No.: US 10,280,525 B2
(45) Date of Patent: May 7, 2019

(54) PHOTOELECTROCHEMICAL DEVICES, METHODS, AND SYSTEMS WITH A CUPRIC OXIDE/CUPROUS OXIDE COATED ELECTRODE

(71) Applicant: THE BOARD OF REGENTS OF THE UNIVERSITY OF TEXAS SYSTEM, Austin, TX (US)

(72) Inventors: Brian Dennis, Arlington, TX (US); Krishnan Rajeshwar, Arlington, TX (US); Norma Tacconi, Arlington, TX (US); Wilaiwan Chanmanee, Arlington, TX (US); Homayon Homayoni, Arlington, TX (US); Ghazaleh Ghadimkhani, Fairfield, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 309 days.

(21) Appl. No.: 15/111,621

(22) PCT Filed: Jan. 17, 2015

(86) PCT No.: PCT/US2015/011877
§ 371 (c)(1),
(2) Date: Jul. 14, 2016

(87) PCT Pub. No.: WO2015/109269
PCT Pub. Date: Jul. 23, 2015

(65) Prior Publication Data
US 2016/0348256 A1    Dec. 1, 2016

Related U.S. Application Data

(60) Provisional application No. 61/928,700, filed on Jan. 17, 2014.

(51) Int. Cl.
*C25B 3/04* (2006.01)
*C25B 15/08* (2006.01)
(Continued)

(52) U.S. Cl.
CPC ............... *C25B 3/04* (2013.01); *B01J 23/72* (2013.01); *B01J 35/002* (2013.01); *B01J 35/004* (2013.01);
(Continued)

(58) Field of Classification Search
None
See application file for complete search history.

(56) References Cited

U.S. PATENT DOCUMENTS

| 2007/0218095 | A1 | 9/2007 | Anderson et al. | 424/411 |
| 2013/0168228 | A1 | 7/2013 | Ozin et al. | 204/157.9 |
| 2014/0291163 | A1* | 10/2014 | Kanan | C25B 3/04 205/555 |

OTHER PUBLICATIONS

International Search Report and Written Opinion in International Application No. PCT/US2015/011877 dated Apr. 17, 2015.
(Continued)

*Primary Examiner* — Kishor Mayekar
(74) *Attorney, Agent, or Firm* — Norton Rose Fulbright US LLP

(57) ABSTRACT

The nanocomposites that include $CuO/Cu_2O$ are described. The nanocomposites can utilized as a photocatalyst and can be incorporated into photoelectrochemical devices. The described devices, systems, and methods can be used for converting $CO_2$ into one or more alcohols with the use of solar energy and electricity.

17 Claims, 19 Drawing Sheets

(51) Int. Cl.
*C25B 13/08* (2006.01)
*C25B 11/04* (2006.01)
*H01G 9/20* (2006.01)
*B01J 23/72* (2006.01)
*B01J 37/34* (2006.01)
*B01J 35/00* (2006.01)
*B01J 35/02* (2006.01)
*H01M 14/00* (2006.01)
*B01D 69/02* (2006.01)
*B01D 69/12* (2006.01)
*B01D 71/02* (2006.01)
*B01D 71/36* (2006.01)
*B01D 71/80* (2006.01)

(52) U.S. Cl.
CPC ....... *B01J 35/0013* (2013.01); *B01J 35/0033* (2013.01); *B01J 35/026* (2013.01); *B01J 37/342* (2013.01); *C25B 11/0405* (2013.01); *C25B 11/0415* (2013.01); *C25B 11/0478* (2013.01); *C25B 13/08* (2013.01); *C25B 15/08* (2013.01); *H01G 9/2004* (2013.01); *H01M 14/005* (2013.01); *B01D 69/02* (2013.01); *B01D 69/12* (2013.01); *B01D 71/022* (2013.01); *B01D 71/36* (2013.01); *B01D 71/80* (2013.01); *B01D 2325/10* (2013.01); *B01D 2325/38* (2013.01); *B01D 2325/42* (2013.01); *Y02P 20/134* (2015.11); *Y02P 20/135* (2015.11)

(56) References Cited

OTHER PUBLICATIONS

International Preliminary Report on Patentability in International Application No. PCT/US2015/011877 dated Jul. 28, 2016.

* cited by examiner

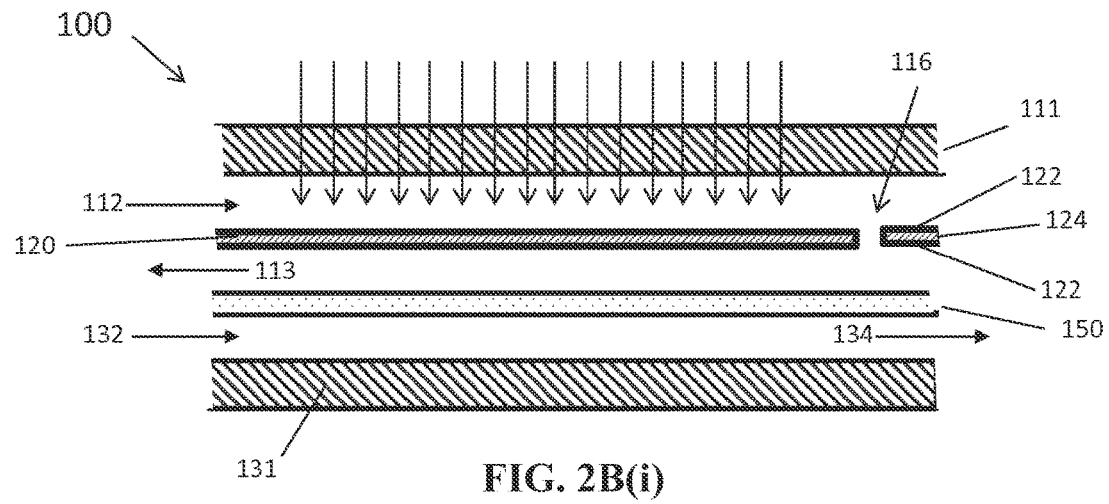
FIG. 2B(i)
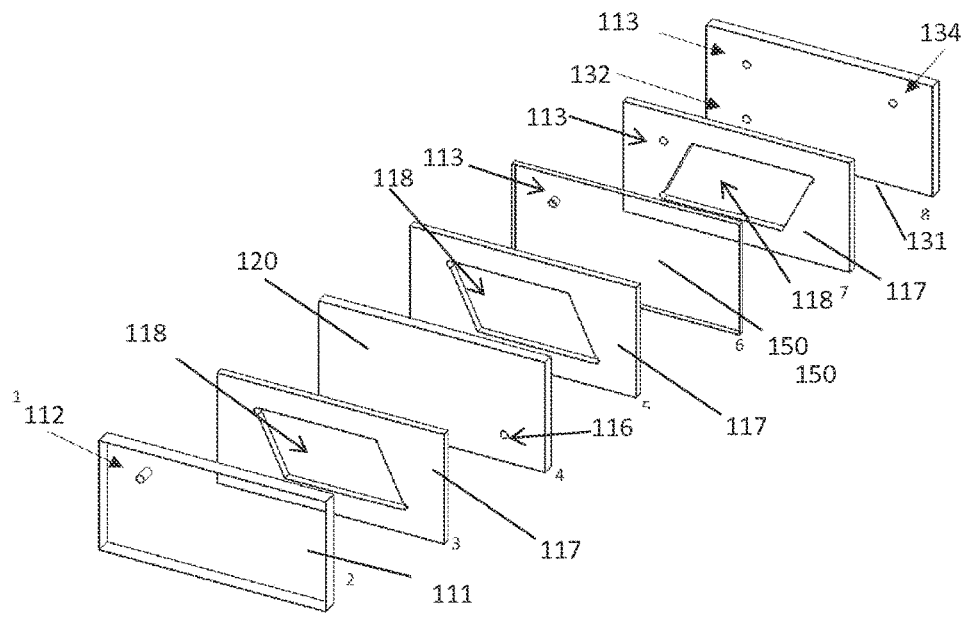
FIG. 2B(ii)

PHOTOELECTROCHEMICAL DEVICES, METHODS, AND SYSTEMS WITH A CUPRIC OXIDE/CUPROUS OXIDE COATED ELECTRODE

CROSS-REFERENCE TO RELATED APPLICATIONS

This application is a national phase application under 35 U.S.C. § 371 of International Application No. PCT/US2015/011877 filed Jan. 17, 2015, which claims priority to U.S. Provisional Application No. 61/928,700 filed Jan. 17, 2014. The entire contents of each of the above-referenced disclosures are specifically incorporated herein by reference without disclaimer.

BACKGROUND OF THE INVENTION

Field of the Invention

The invention generally concerns methods, devices, and systems using an electrode having a $CuO/Cu_2O$ array as well as methods, devices, and systems related to continuous flow solar reactors.

Description of Related Art

Hydrocarbons are essential in modern life. Hydrocarbons are used as fuel and raw material in various fields, including the chemical, petrochemical, plastics, and rubber industries. Fossil fuels, such as coal, oil and gas, are composed of hydrocarbons with varying ratios of carbon and hydrogen, and are non-renewably used when combusted, forming carbon dioxide and water. Despite their wide application and high demand, fossil fuels present a number of disadvantages, including the finite reserve, irreversible combustion and contribution to air pollution and global warming. Considering these disadvantages, and the increasing demand for energy, alternative sources of energy are needed.

One potential alternative source is $CO_2$, an actual by-product of fossil fuel combustion. Given that $CO_2$ is a greenhouse gas, using sunlight to convert $CO_2$ to transportation fuel (such as methanol or ethanol) represents a value-added approach to the simultaneous generation of alternative fuels and environmental remediation of carbon emissions from the continued use of conventional fuels.

Selective conversion of $CO_2$ to alcohols like methanol and ethanol and other small organics has several redeeming features especially in light of the fact that large amounts of these chemicals are manufactured worldwide. For example, in the US alone there are eighteen methanol production plants with a cumulative annual capacity of over 2.6 billion gallons. However, the current feedstock for this production is hydrocarbon based with a sizeable carbon footprint. Further, the high operating pressures and temperatures needed for steam reforming translate into correspondingly high capital investment and a long energy pay-back period. Therefore, mild methods for producing methanol, as well as for other alcohols and small organics, from environmentally problematic feedstocks such as $CO_2$ take on added importance.

SUMMARY

The present application offers a solution to the current problems associated with generating alcohols, such as methanol, ethanol, and propanol, with $CO_2$ in an energy efficient and/or cost efficient manner, especially one with lower toxicity. The solution is premised on a photoelectrochemical device comprising a photocathode having a $CuO/Cu_2O$ nanorod array. Photoelectrochemical cells in accordance with the present disclosure can be used to convert $CO_2$ and water into one or more alcohols. With the use of a $CuO/Cu_2O$ nanoarray, a combination of solar energy and electricity can drive the reaction, and thus, it is referred to as a "photoelectrochemical" (PEC) process. The devices, systems, and methods in accordance with the present invention can be used to produce reaction products, like $CO_2$, on a continuous basis.

One aspect of the disclosure relates to a nanostructure comprising: an elongated CuO core having a lateral surface and a top surface and a plurality of $Cu_2O$ particles deposited on at least a portion of the lateral surface. In various embodiments, the elongated CuO core is a nanorod. In various embodiments, the CuO core comprises a width dimension of between 40 nm and 200 nm. In various embodiments, the CuO core comprises a length between 0.5 and 15 μm. In various embodiments, the $Cu_2O$ particles form a discontinuous coating on the lateral surface of the elongated CuO core. In various embodiments, the $Cu_2O$ particles form a continuous coating on at least a portion of the lateral surface of the elongated CuO core. In various embodiments, the coating has a thickness of between 30 nm and 100 nm. In various embodiments, at least a portion of the top surface does not have $Cu_2O$ particles deposited thereon. In various embodiments, the $Cu_2O$ particles are crystallites.

Another aspect of the disclosure relates to a metal oxide nanoarray comprising a plurality of the above described nanostructures. In a further aspect of the disclosure, a photocatalyst can comprise a conducting substrate and a photoactive layer comprising a plurality of the above described nanostructures, where a majority of the nanostructures project from the conducting substrate. In various embodiments, the substrate is copper. In another aspect, an electrode can comprise this photocatalyst.

Other aspects of the disclosure relate to a photoelectrochemical device comprising: a cathode chamber comprising a substantially transparent cover, a first inlet, a first outlet, a photocathode comprising the above described photocatalyst, and a first channel partially defined by the transparent cover and partially defined by the photocathode and in fluid communication with the first inlet and the first outlet; an anode chamber comprising a conducting member, a second inlet, a second channel, and a second outlet; and a proton conducting membrane separating and partially defining a section of the first channel and a section of the second channel. In various embodiments, the substantially transparent cover and the photocathode form two opposing surfaces. In various embodiments, the photocathode comprises a first surface, a second surface and at least one aperture at or near an end opposite from the first inlet, and the first channel is at least partially defined by both the first surface and the second surface. In various embodiments, a first section of the first channel is partially defined by two opposing surfaces of the substantially transparent cover and the first surface of the photocathode and a second section of the first channel is partially defined by two opposing surfaces of the proton conducting membrane and the second surface of the photocathode. In various embodiments, the first inlet is configured for gaseous $CO_2$ inflow; the first outlet is configured for gaseous outflow comprising one or more alcohols; and the photocathode is porous and extends alongside the proton conducting membrane. In various embodiments, the first channel is partially defined by a first surface opposing a second surface; the substantially transparent cover comprises the first surface and the photocathode; and the proton conducting membrane comprises the second surface. In various embodiments, the photocathode is in contact with the proton conducting membrane. In various embodiments, the first inlet is configured for a first electrolyte solution inflow comprising $CO_2$, the first outlet is configured for a first electrolyte solution outflow comprising one or more alcohols; and the photocathode is porous and extends alongside the proton conducting membrane. In various embodiments, the second channel is partially defined by two opposing surfaces of the conducting member and the proton conducting membrane. In various embodiments, the CuO core is exposed to the first channel at a tip of a majority of nanorods of the nanorod array. In various embodiments, the width of the first channel is between 30 μm and 100 μm. In various embodiments, the width of the second channel is less than 150 μm or less than 100 μm. In various embodiments, a spacer body defining an opening is disposed between the substantially transparent cover and the photocathode. In various embodiments, the conducting substrate is copper. In various embodiments, the conducting substrate is supported by a base plate. In various embodiments, the substantially transparent cover is a thin sheet. In various embodiments, the substantially transparent cover is less than 5 mm. In various embodiments, the substantially transparent cover comprises quartz, glass, or a plastic material. In various embodiments, the proton conducting membrane comprises an ionomer. In various embodiments, the proton conducting membrane comprises a persulfonic acid/polytetrafluoroethylene copolymer.

Yet another aspect of the disclosure relates to a system comprising a dual chamber photoelectrochemical device comprising: a cathode chamber comprising: a photocathode having a photocatalyst according to the present disclosure, a substantially transparent cover configured to permit the photocathode to be irradiated with light during use, and an anode chamber comprising an anode that is electrically connected to the photocathode, the anode chamber separated from the cathode chamber by a proton conducting membrane; a power supply configured to apply an electric potential across the photocathode and the anode; and a storage tank for storing a reaction product generated in the photoelectrochemical device. In various embodiments, the system can further comprise an alcohol isolation unit for extracting one or more alcohols from a first electrolyte solution. In various embodiments, the system can further comprise a gas transfer unit for transferring $CO_2$ into the first electrolyte solution. In various embodiments, the system can further comprise a first pump configured to pump the first electrolyte solution through the gas transfer unit, the cathode chamber, and the alcohol isolation unit. In various embodiments, the gas transfer unit comprises a hydrophobic membrane disposed between a first channel through which the first electrolyte solution flows and a second channel through which $CO_2$ flows. In various embodiments, the system can further comprise a first electrolyte return conduit to transfer the first electrolyte solution from the alcohol isolation unit to the gas transfer unit. In some embodiments, the system can further comprise a second pump configured to pump a second electrolyte solution through the anode chamber. In various embodiments, the system can further comprise a gas isolation unit for extracting $O_2$ from the second electrolyte solution where the second pump is configured to pump the second electrolyte solution from the anode chamber to the gas isolation unit. In various embodiments, the system can further comprise a second electrolyte return conduit to transfer the second electrolyte solution to the anode chamber.

Another aspect of the disclosure relates to a method of converting carbon dioxide to one or more alcohols comprising dissolving $CO_2$ into a first electrolyte solution; pumping the first electrolyte solution with dissolved CO2 into a cathode chamber, where the cathode chamber comprises a photocathode having a photocatalyst in accordance with the present disclosure and the photocathode being irradiated with light; and pumping a second electrolyte solution into an anode chamber, where the cathode chamber and the anode chamber are separated by a proton conducting membrane and the anode chamber comprises an anode that is electrically connected to the photocathode. In various embodiments, the method can further comprise pumping the first electrolyte solution into an alcohol isolation unit and substantially isolating the alcohol from the electrolyte solution, where the alcohol isolation unit comprises a fractional distillation column. In various embodiments, the method further comprises transferring isolated alcohol to an alcohol storage tank. In various embodiments, the method further comprises pumping the first electrolyte solution from the alcohol isolation unit to the $CO_2$ transfer unit. In various embodiments, dissolving the $CO_2$ into the first electrolyte solution comprises the first electrolyte solution flowing through a gas transfer unit, and the $CO_2$ is transferred through a hydrophobic membrane. In various embodiments, the hydrophobic membrane has a water contact angle greater than 100° and a thickness less than 15 μm. In various embodiments, the hydrophobic membrane comprises polytetrafluoroethylene. In various embodiments, a section of the first channel extends through the cathode chamber and is partially defined by a substantially transparent cover and the photocathode. In various embodiments, a section of the first channel is partially defined by the proton conducting membrane, where the proton conducting membrane comprises a persulfonic acid/polytetrafluoroethylene copolymer. In various embodiments, an electric potential is applied across the photocathode and anode, where the electric potential of between −0.2 V and −0.85 V as compared to a standard hydrogen electrode is applied across the photocathode and anode. In various embodiments, the method can further comprise pumping a second electrolyte solution through the anode chamber, where a third channel, through which the second electrolyte solution flows, is partially defined by the proton conducting membrane. In various embodiments, the third channel is partially defined by two opposing surfaces of the proton conducting membrane and the anode. In various embodiments, the second electrolyte solution comprises between 0.01M to 0.5M sodium bicarbonate. In various embodiments, the method can further comprise pumping the second electrolyte solution from the anode chamber into gas isolation unit to remove $O_2$ from the second electrolyte solution. In various embodiments, a pressure in the first channel, the second channel, and the third channel is between 0.7 atm and 1.2 atm. where the flow rate of the first electrolyte solution is between 0.2 mL/hr*cm$^2$ and 20 mL/hr*cm$^2$, such as 0.4, 0.6, 0.8, 1, 2, 3, 4, 5, 6, 7, 8, 10, 12, 14, 16, or 18, or any other value therebetween. In various embodiments, the first electrolyte solution comprises between 0.01M to 0.5M sodium bicarbonate. In various embodiments, the first electrolyte solution has a temperature between 15° C. and 50° C. In various embodiments, the anode comprises at least one of platinum, gold, graphite, aluminum, and stainless steel. In various embodiments, the method can further comprise electrodepositing $Cu_2O$ onto the photocathode to regenerate the photocathode after a period of use. In various embodiments, a solution of $CuSO_4$ is pumped into the cathode chamber during the electrodeposition.

Yet another aspect of the present disclosure relates to method of converting $CO_2$ to one or more alcohols comprising pumping $CO_2$ into a cathode chamber, where the cathode chamber comprises a photocathode having a photocatalyst in accordance with the present disclosure and a first electrolyte solution, and the cathode chamber comprises a transparent cover configured to allow the photocathode to be irradiated with light during use; and pumping a second electrolyte solution into a anode chamber, where the anode chamber and the cathode chamber are separated by a proton conducting membrane. In various embodiments, substantially all of the plurality of nanostructures of the photocatalyst comprises a CuO core and $Cu_2O$ shell. In various embodiments, the method can further comprise pumping a gas from the cathode chamber, where the gas comprises one or more alcohols. In various embodiments, the method can further comprise transferring the one or more alcohols to a storage tank. In various embodiments, the cathode chamber further comprises: a gas inlet configured for $CO_2$ inflow to the first channel; and a gas outlet configured for gas outflow comprising one or more alcohols from the first channel; where the photocathode is porous and extends alongside the proton conducting membrane. In various embodiments, the first channel is partially defined by a first surface opposing a second surface, the transparent cover comprises the first surface, and the photocathode and the proton conducting membrane comprise the second surface. In various embodiments, the photocathode is in contact with the proton conducting membrane. In various embodiments, the anode chamber comprises a second channel that is partially defined by two opposing surfaces of the conducting member and the proton conducting membrane, through which the second electrolyte solution flows. In various embodiments, the $CO_2$ is in a gaseous phase. In various embodiments, the temperature in the first channel is between 70° C. and 100° C.

Another aspect of the disclosure relates to an electrolytic bath comprising a basic aqueous solution of cupric ions, a conducting substrate, and a plurality of elongated CuO nanostructures projecting from the substrate. In various embodiments, the solution further comprises an additive, such as a brightener or stabilizing agent, e.g., lactic acid, tartaric acid, malic acid, and/or boric acid, and is at a pH of between 7 and 12.

Another aspect of the disclosure comprises a method of making the nanostructure array comprising cleaning a surface of a Cu component; forming CuO nanostructures on the surface, such as by a sol-gel technique followed by thermal treatment; and electrodepositing $Cu_2O$ particles on the CuO nanostructures. In various embodiments, forming the CuO nanostructures comprises heating the Cu component to a temperature between 150° C. and 700° C. and isothermally heating at the temperature. In various embodiments, forming the CuO nanostructures comprises forming $Cu(OH)_2$ nanostructures on the surface and then heating the Cu component to a temperature between 150° C. and 400° C. In various embodiments, electrodepositing $Cu_2O$ particles on the CuO nanostructures comprises placing the Cu component in an electrolytic bath comprising cupric ions. In some embodiments, forming CuO nanostructures comprises forming $Cu(OH)_2$ nanoarray on the surface and then heating to convert to CuO. In various embodiments, the forming of CuOH(2) nanoarray comprises contacting the surface, such as by soaking it, with a solution comprises NaOH and $(NH_4)_2S_2O_8$ or other suitable compounds. In some embodiments, the contact time can be greater than 20, 40, 60, 80, 100, 120, 140, 160, or 180 min.

The term "nanostructure" refers to an object or material in which at least one dimension of the object or material is equal to or less than 100 nm (e.g., one dimension is 1 to 100 nm in size). In a particular aspect, the nanostructure includes at least two dimensions that are equal to or less than 200 nm (e.g., a first dimension is 1 to 200 nm in size and a second dimension is 1 to 200 nm in size). In another aspect, the nanostructure includes three dimensions that are equal to or less than 200 nm (e.g., a first dimension is 1 to 200 nm in size, a second dimension is 1 to 200 nm in size, and a third dimension is 1 to 200 nm in size). The shape of the nanostructure can be of a wire, whisker, fiber, a tube, a particle, a sphere, a rod, a tetrapod, a hyperbranched structure, or mixtures thereof.

The terms "a" and "an" are defined as one or more unless this disclosure explicitly requires otherwise.

The preposition "between," when used to define a range of values (e.g., between x and y) means that the range includes the end points (e.g., x and y) of the given range and the values between the end points.

The term "substantially" is defined as being largely but not necessarily wholly what is specified (and include wholly what is specified) as understood by one of ordinary skill in the art. In any disclosed embodiment, the term "substantially" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, the methods and systems of the present invention that "comprises," "has," "includes" or "contains" one or more elements possesses those one or more elements, but is not limited to possessing only those one or more elements. Likewise, an element of a method or system of the present invention that "comprises," "has," "includes" or "contains" one or more features possesses those one or more features, but is not limited to possessing only those one or more features.

Furthermore, a structure that is capable performing a function or that is configured in a certain way is capable or configured in at least that way, but may also be capable or configured in ways that are not listed.

The feature or features of one embodiment may be applied to other embodiments, even though not described or illustrated, unless expressly prohibited by this disclosure or the nature of the embodiments.

Any method or system of the present invention can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure may not be labeled in every figure in which that structure appears. Identical reference numbers do not necessarily indicate an identical structure. Rather, the same reference number may be used to indicate a similar feature or a feature with similar functionality, as may non-identical reference numbers.

FIG. 2B(ii) is a schematic, exploded view of the embodiment shown in FIG. 2B(i).

FIG. 13A shows a CuO nanorod array formed from an 80 minute soak. FIG. 13B shows a $CuO/Cu_2O$ nanorod array formed from an 80 minute soak and a 15 minute deposition time. FIG. 13C shows a $CuO/Cu_2O$ nanorod array formed from an 80 minute soak and a 20 minute deposition time. FIG. 13D shows a $CuO/Cu_2O$ nanorod array formed from an 80 minute soak and a 30 minute deposition time. FIG. 13E shows a $CuO/Cu_2O$ nanorod array formed from a 50 minute soak. FIG. 13F shows a $CuO/Cu_2O$ nanorod array formed from a 50 minute soak and a 10 minute deposition time.

DETAILED DESCRIPTION OF ILLUSTRATIVE EMBODIMENTS

Various features and advantageous details are explained more fully with reference to the non-limiting embodiments that are illustrated in the accompanying drawings and detailed in the following description. It should be understood, however, that the detailed description and the specific examples, while indicating embodiments of the invention, are given by way of illustration only, and not by way of limitation. Various substitutions, modifications, additions, and/or rearrangements will become apparent to those of ordinary skill in the art from this disclosure.

In the following description, numerous specific details are included to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figures 1A, 1B:
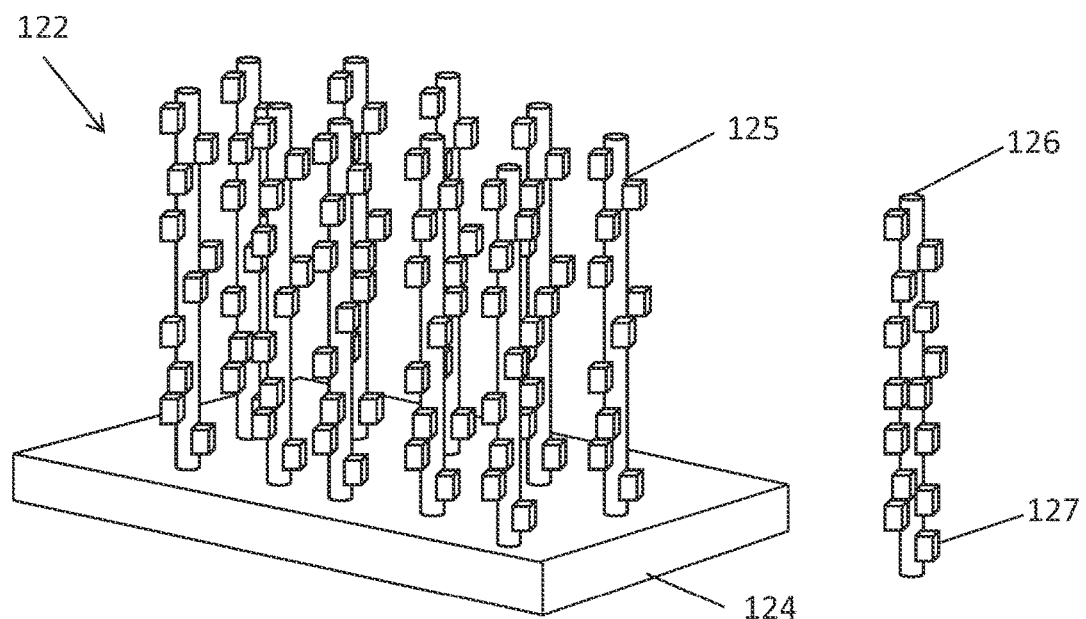
FIG. 1A is a schematic representation of a $CuO/Cu_2O$ nanorod.
FIG. 1B is a schematic representation of a $CuO/Cu_2O$ nanorod array.

One aspect of the present disclosure comprises a $CuO/Cu_2O$ composite nanostructure. With reference to FIGS. 1A, the nanostructure 125 can comprise a CuO portion 126 and a $Cu_2O$ portion 127. In some embodiments, CuO portion 126 is the core portion, i.e., disposed underneath or at least partially coated or encased by a $Cu_2O$ layer 127. In some embodiments, CuO core 126 comprises a lateral surface and a top surface and the $Cu_2O$ layer 127 can comprise a substantially complete or partial and/or a substantially continuous or discontinuous coating of $Cu_2O$ particles or crystallites on at least a portion of the lateral surface of core 126.

The shape of nanostructure 125 can be spherical, cylindrical, whisker-like, wire-like, tubular, branched, or prismoidal. In various embodiments, the shape of nanostructure 125 is elongated, e.g., a nanorod or nanowire. On average, the aspect ratio of an elongated nanostructure 125 can be at least 5, 10, 15, 20, 25, 30, 35, 40, 45, 50, or any amount or range therebetween. On average, nanostructure 125 comprises a width or diameter of about 40 nm up to about 200 nm. In addition, the height of nanostructure 125 can range between about 0.5 µm to 20 µm or more, such as 2 µm, 4 µm, 6 µm, 8 µm, 10 µm, 12 µm, 14 µm, 16 µm, 18 µm, or any value or range therebetween. The thickness of $Cu_2O$ layer 127 can be between about 30 nm and 100 nm, such as 35 nm, 40 nm, 45 nm, 50 nm, 55 nm, 60 nm, 65 nm, 70 nm, 75 nm, 80 nm, 85 nm, 90 nm, 95 nm, or any value or range therebetween.

As discussed in further detail below, process conditions can be varied to vary the shape of nanostructure 125. In some embodiments, the length of core 126 can be varied by varying the time and temperature of thermal treatment. In addition, varying the thermal treatment temperature (e.g., a treatment temperature between 100° C. to 700° C., e.g.,150° C., 200° C., 250° C., 300° C., 350° C., 400° C., 450° C., or 500° C.), or varying the rate of heating (e.g., 5 10°/min, 10°/min, 12°/min, 15°/min, 17°/min, 20°/min, 22°/min, 25°/min, or 30°/min) can influence the growth rate as well as size, uniform, density, and diameter distribution of CuO nanowires. The thickness of layer 127 can be increased by increasing the process time. For example, the $Cu_2O$ electrodeposition time can be between about 0.1 min. to 60 min. or more, such as 1, 2, 5, 7, 10, 12, 15, 20, 25, 30, 35, 40, 45, 50, or 55 min., or any other value therebetween. In some embodiments, the electrodeposition time is about 5 min. to about 15 min or between about 8 min and about 12 min. Layer 127 can also be varied by the concentrations of copper salts, additives, free acid, temperature, cathode current density, type and area of substrate, roughness of substrate, ratio of anode to cathode area, and degree of agitation. Further information regarding electrodeposition solutions and conditions can be found in Modern Electroplating, J. Wiley and Sons, p. 33-78: "2: Electrodeposition of Copper" by Dini and Snyder (2010), which is hereby incorporated by reference in its entirety.

Figure 1C:
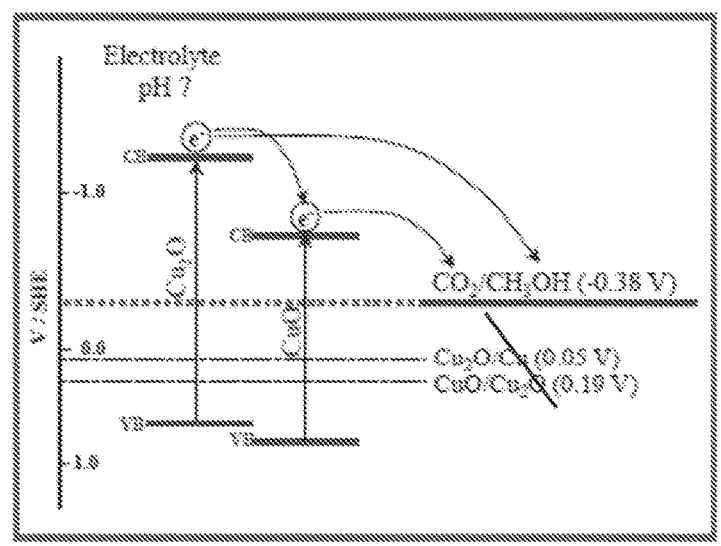
FIG. 1C is an energy band diagram of hybrid $CuO/Cu_2O$ nanorod arrays for solar photoelectrosynthesis of $CH_3OH$ from $CO_2$. Semiconductor band edges and redox potentials are shown vs. standard hydrogen electrode (SHE). In the figure, CB indicates conduction band; VB indicates valence band.

In various embodiments, the photoreduction reaction, such as one converting $CO_2$ to one or more alcohols, is assisted by the favorable band edge alignment of the two oxide phases of nanostructure 125, as depicted in FIG. 1C. As shown, the valence band of CuO is located positive to the corresponding level in $Cu_2O$. Thus, in a $CuO/Cu_2O$ core/shell nanorod, it is believed that the differences in band edges of the two oxides translate to a vectorial transfer of photogenerated electrons from the $Cu_2O$ shell to the CuO core. In addition, as the $Cu_2O$ is also in contact with the electrolyte, the photogenerated electrons in the $Cu_2O$ shell are able to be directly transferred to $CO_2$. This possible double pathway for injection of photoelectrons to $CO_2$ is likely a contributor to the enhanced PEC performance of $CuO/Cu_2O$ nanorod arrays relative to a single phase $Cu_2O$ film, as demonstrated in the Examples described herein. Additionally, the increased surface area of the $CuO/Cu_2O$ nanorod array relative to a $Cu_2O$ electrodeposited directly on a Cu flat surface may also be an additional factor. Thus, to facilitate a double injection pathway, in some embodiments, CuO core 126 can be exposed to first channel 114 at a tip 128 of at least a majority of nanorods 125 of nanorod array 122.

Another aspect of the present disclosure comprises a metal oxide nanoarray of the above described nanostructure. With reference to FIG. 1B, a metal oxide nanoarray 122 comprises a plurality of nanostructures 125. In some embodiments, nanoarray 122 is disposed on or projecting from at least a portion of a substrate 124, e.g. a conducting substrate. The base of nanostructure 125 can be attached to substrate 124. In some embodiments, the substrate is copper. Other substrates can include other conducting materials or non-conducting materials, such as ceramic. Substrate can be provided by a piece of foil, sheet, plate, rod, or any other suitable component. In some embodiments, the thickness of the substrate can be between about 50 µm and 1000 µm, such as 100, 150, 200, 250, 300, 350, 400, 450, 500, 550, 600, 650, 700, 750, 800, 850, 900, or 950 µm, or any other value therebetween. In various embodiments, conducting substrate 124 is supported by a base plate 129. In some embodiments, a photocatalyst can comprise conducting substrate 124 and a photoactive layer comprising an array of nanostructures 125. In addition, the photocatalyst can be utilized as part of an electrode.

Figure 2A:
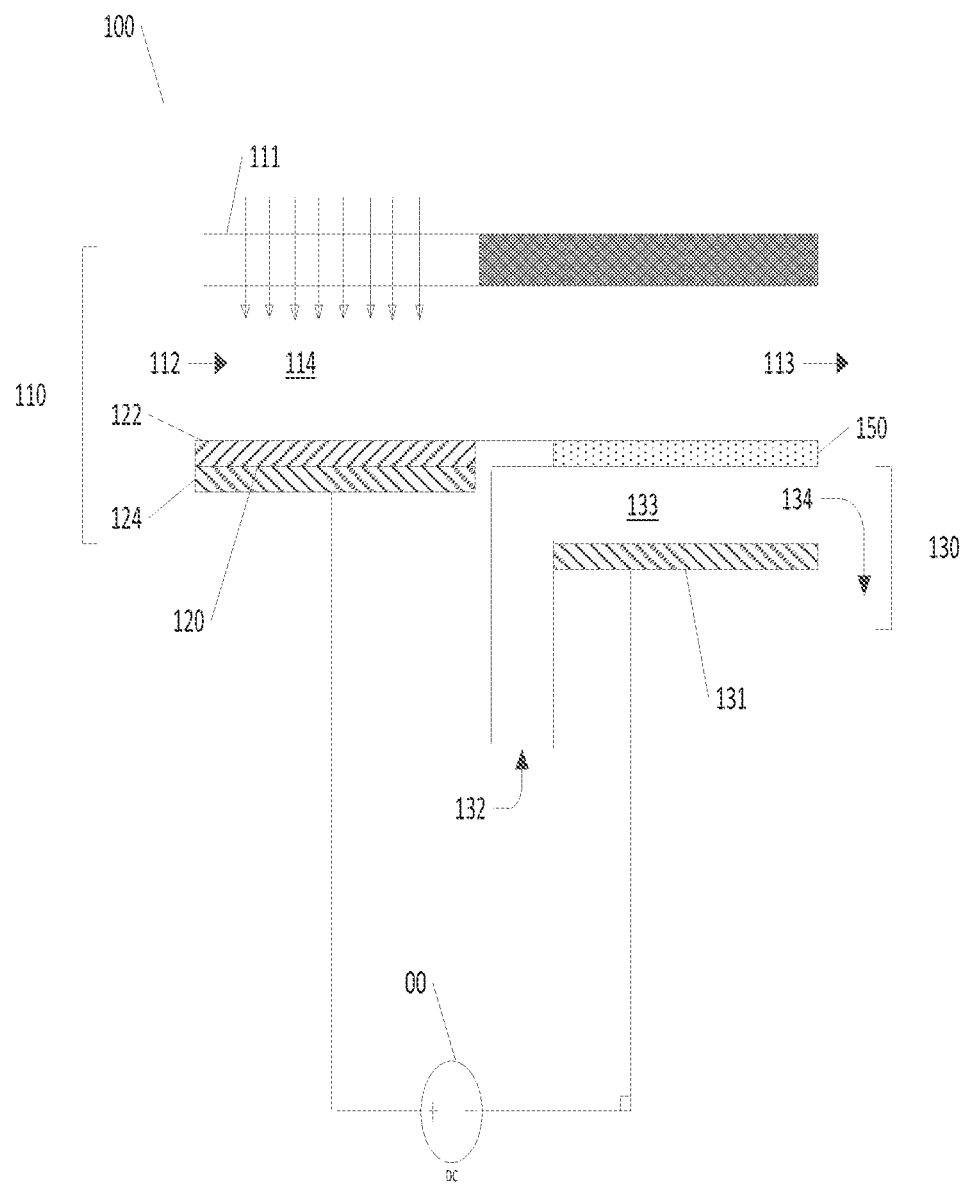
FIGS. 2A, 2B(i), and 2C are schematic cross-section of various embodiments of a photoelectrochemical device.
Figure 2C:
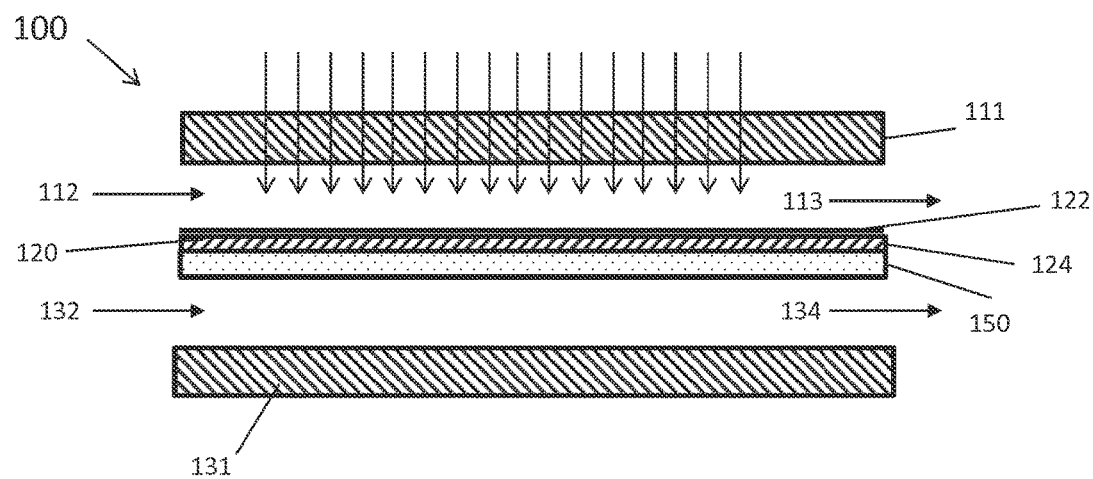

Another aspect of the present disclosure comprises PEC devices utilizing the above described photocatalysts. FIGS. 2A to 2C depict various embodiments of a PEC device 100 comprising a cathode chamber 110, an anode chamber 130, and a proton conducting membrane 150 separating the two. Cathode chamber 110 comprises: a substantially transparent cover 111, a first inlet 112, a first outlet 113, a photocathode 120; and a first channel 114 in fluid communication with first inlet 112 and first outlet 113. Photocathode 120 comprises a nanorod array 122 disposed on a conducting substrate 124. Anode chamber 130 comprises: a conducting member/anode 131, a second inlet 132, a second channel 133, and a second outlet 134; and a proton conducting membrane 150 separating and partially defining a section of first channel 114 and a section of second channel 133.

The dimensions of photocathode 120 can comprise any suitable width and length for irradiation. In some embodiments, the area of a portion of photocathode 120 intended to be exposed to radiation comprises 1 $cm^2$ to 1 $m^2$ or more.

In various embodiments, anode 131 comprises a conducting material. For example, anode 131 can comprise platinum, gold, graphite, aluminum, stainless steel, or any other suitable material. In some embodiments, anode 131 can also comprise a photoactive material. In some embodiments, such as one involving conversion of $CO_2$ to one or more alcohols, water in the electrolyte is oxidized to $O_2$ in anode chamber 130.

To irradiate photocathode 120, transparent cover 111 extends the same approximate area of photocathode 120 and nanorod array 122 or a portion thereof faces transparent cover 111. In some embodiments, transparent cover 111 is a thin sheet. For example, transparent cover 111 can be less than about 10 mm, about 5 mm, about 4 mm, about 3 mm, about 2 mm, about 1 mm, about 0.5 mm, about 0.1 mm, or any amount therebetween. In some embodiments, transparent cover 111 comprises any material through which radiation, such as sunlight, can pass through, e.g., quartz, glass, a transparent plastic material such as poly(methyl methacrylate), polycarbonate, or the like.

To provide for first channel 114, a spacer body 117 (illustrated in FIG. 2B(ii)) is configured to space-apart the components that partially define a channel, such as a first channel 114 or second channel 133. In the depicted embodiment, spacer body 117 is disposed between transparent cover 111 and photocathode 120 and/or a base plate 129. In the shown embodiment, spacer body 117 is disposed between photocathode 120 and membrane 150 and/or between membrane 150 and conducting member/anode 131. In the embodiment shown, spacer body 117 defines an opening 118 in alignment with and/or coextensive with a portion of first channel 114. More particularly, three spacer bodies 117 are used to space apart transparent cover 111 and photocathode 120, photocathode 120 and membrane 150, and membrane 150 and conducting member/anode 131. In various embodiments, the width of first channel 114 or the distance between transparent cover 111 and photocathode 120 can be between about 50 μm and 1 cm, such as 55, 60, 65, 70, 75, 80, 85, 90, or 95 μm, or any other value therebetween. The spacer body 117 slightly constricts flow in its vicinity, as the body 117 about opening 118 causes the width (or the area to receive radiation) of the channel to be slight reduced. In some embodiments, first channel 114 is at least partially defined transparent cover 111 and photocathode 120. In further embodiments, first channel 114 is at least partially defined by one or more spacer bodies 117, transparent cover 111 and photocathode 120. In addition, transparent cover 111 and photocathode 120 can be two opposing surfaces between which first channel 114 extends.

Similarly, in some embodiments, conducting member 131 and proton conducting membrane 150 form two opposing surfaces that partially define second channel 133. Moreover, the width of second channel 133 can be any suitable width to facilitate proton transfer through membrane 150. In some embodiments, the width of second channel 133 is between 80 to 120 μm. In some embodiments, the width of second channel 133 is less than 100, 90, 80, 70, 60, 50, 40, or 30 μm.

To facilitate ionic contact between cathode chamber 110 and anode chamber 130, proton conducting membrane 150 comprises a semipermeable membrane that conducts protons while being substantially impermeable to gases, such as oxygen. In various embodiments, proton conducting membrane 150 comprises an ionomer. For example, proton conducting membrane 150 comprises a perfluorosulfonic acid ($H^+$ form)/polytetrafluoroethylene copolymer (Nafion®). Other proton conducting membrane 150 can comprise polyethylene-tetra-fluoroethylene grafted sulphonyls, such as by suppliers Solvay (Tradename: CRA-08), tetra-fluoroethylene grafted poly(styrene sulfonic acid) such as by Pall (Tradename: IonClad®R1010), and sulfonated poly(ether ether ketone) (SPEEK). Other proton conducting membranes or guidelines for selecting or designing membranes can be found in the following article: Viswanathan & Helen, "Is Nafion, the only choice?", Bulletin of the Catalysis Society of India, 6 (2007) 50-66, which is hereby incorporated by reference in its entirety.

Embodiments of PEC device 100 can be utilized to convert $CO_2$ to one or more alcohols by introducing $CO_2$ dissolved in an electrolyte solution into cathode chamber 110. Some of these embodiments can also be utilized to convert $CO_2$ to one or more alcohols by introducing $CO_2$ into cathode chamber 110 in a gaseous state.

Figure 3:
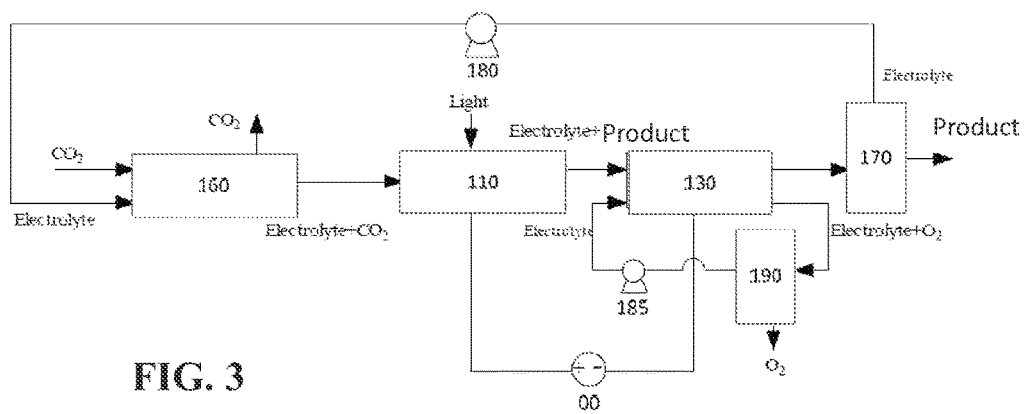
FIG. 3 is a schematic representation of an embodiment of a photoelectrochemical system.

FIG. 3 depicts a system 300, in accordance with the present disclosure, involving a reactant, such as $CO_2$, dissolved in an electrolyte solution and comprising: a gas transfer unit 160; a dual chamber PEC device comprising a cathode chamber 110 and an anode chamber 130; an alcohol isolation unit 170 for extracting alcohol from the first electrolyte solution; a first pump 180 configured to pump a first electrolyte solution through gas transfer unit 160, cathode chamber 110, and alcohol isolation unit 170; a second pump 185 configured to pump a second electrolyte solution through anode chamber 130; a power source 00 to supply an electric potential across the photocathode and the anode; and optionally, an alcohol storage tank (not shown) for storing the alcohol isolated by alcohol isolation unit 170. Moreover, some embodiments can further comprise a gas isolation unit 190 downstream from anode chamber 130 to isolate the generated $O_2$ from the second electrolyte solution. In addition, second pump can be configured to pump the second electrolyte solution from anode chamber 130 to $O_2$ isolation unit 190, and upon extraction of $O_2$, recycle the second electrolyte solution back to anode chamber 130 via a second electrolyte return conduit 194. Similarly, system 300 can further comprise a first electrolyte return conduit 196 to recycle the first electrolyte solution from alcohol isolation unit 170 to gas transfer unit 160. FIG. 2A depicts cathode chamber 110 and anode chamber 130 where anode chamber 130 is disposed downstream and to the side of or away from photocathode 120.

Figure 3A:
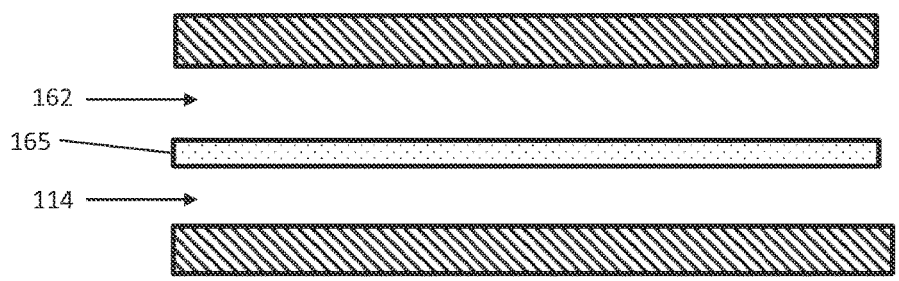
FIG. 3A is a schematic cross-section of an embodiment of a gas transfer unit.

To facilitate transfer of the $CO_2$ into the first electrolyte solution, with reference to FIG. 3A, gas transfer unit 160 can comprise two channels separated by a hydrophobic membrane 165. Through a first channel 114, the first electrolyte solution can flow, and through second channel 162, $CO_2$ in a gaseous state can flow. Hydrophobic membrane 165 is designed to prevent or impede transfer of water from first channel 114 into second channel 162 but allow $CO_2$ to do the converse. As such, in some embodiments, hydrophobic membrane 165 has a water contact angle greater than 100°, 110°, 120°, 130°, 140°, 150°, 160°, or any amount up to 180°. In addition, hydrophobic membrane 165 can be thin porous material. For example, membrane 165 can comprise a thickness less than 15 μm. In some embodiments, hydrophobic membrane 165 comprise expanded polytetrafluoroethylene, or other porous material with a water contact angle greater than 100° and maximum pore size less than 50 μm. Other types of gas transfer units may also be utilized, preferably providing for continuous flow during the transfer.

In a separate fluid channel or loop, a second electrolyte flows past anode 131. Water present in the electrolyte is oxidized to form $O_2$. In order to harvest this byproduct, the system can comprise gas isolation unit 190 to separate $O_2$ from the liquid electrolyte. Any standard method or device for performing this separation could be used, preferably one in a continuous fashion. For example, unit 190 can comprise a liquid-gas separation column that allows gas bubbles to rise to the top and form a gas head space and vented through a valve while liquids flow down through a bottom valve. The vented gas, $O_2$, can be captured in this manner.

In a similar fashion, produced alcohols and other organic products can be isolated in alcohol isolation unit 170. For example, alcohol isolation unit 170 can comprise a fractional distillation column. From here, the alcohol products can be transferred and stored in a storage tank and the electrolyte can be recycled back to gas transfer unit 160.

Figure 4:
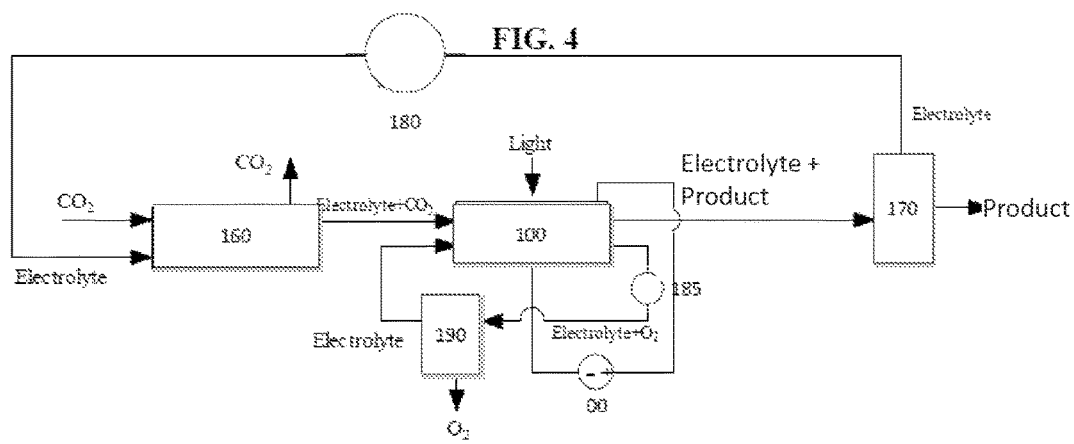
FIG. 4 is a schematic representation of an embodiment of a photoelectrochemical system.

FIG. 4 depicts a system essentially the same as that described above and depicted in FIG. 3. However, cathode chamber 110 and anode chamber 130 and/or a section of the proton conducting membrane 150 are stacked or disposed beneath a section of photocathode 120. As such, the flow direction of the first channel must pass through a section of photocathode 120. For example, with reference to FIGS. 2B(i) and 2B(ii), PEC device can comprise photocathode 120 as described herein comprising a first surface, a second surface, and one or more openings 116 spaced apart from first inlet 112, such as located at or near an end opposite from first inlet 112. As such, first channel 114 is at least partially defined by both the first surface and the second surface. Furthermore, a first section of first channel 114 can be partially defined by two opposing surfaces of transparent cover 111 and the first surface of photocathode 120, and a second section of first channel 114 can be partially defined by two opposing surfaces of proton conducting membrane 150 and the second surface of photocathode 120. Alternatively, in some embodiments, photocathode 120 can comprise a plurality of openings 116 dispersed across its area, such as a screen or mesh, with proton conducting membrane 150 disposed beneath photocathode 120.

A method of converting carbon dioxide to one or more alcohols can comprise a continuously flowing system, e.g., a system as depicted in FIG. 3 or FIG. 4 and described herein. The initial steps comprise dissolving $CO_2$ into a first electrolyte solution and then pumping the first electrolyte solution with the dissolved $CO_2$ into cathode chamber 110 with photocathode 120, in accordance with the present disclosure, while at least a portion of photocathode 120 is being irradiated. In some embodiments, the solution pumped into cathode chamber 110 is a $CO_2$-saturated electrolyte solution. Concurrently, a second electrolyte solution is being pumped into anode chamber 130, and as described herein, cathode chamber 110 and anode chamber 130 are separated by proton conducting membrane 150.

From the PEC device, the first electrolyte solution can be pumped into alcohol isolation unit 170. In alcohol isolation unit 170, a substantial portion of the alcohol is extracted from the electrolyte solution. Once extracted, the recovered first electrolyte solution can recycle to gas transfer unit 160 where $CO_2$ can again be dissolved therein.

Similarly, in some embodiments, the second electrolyte solution can be pumped from anode chamber 130 into $O_2$ isolation unit 190. In the $O_2$ isolation unit 190, a substantial portion of the $O_2$ generated in the anode chamber 130 is extracted from the second electrolyte solution. Once extracted, the recovered second electrolyte solution can recycle to the anode chamber 130.

The process conditions and parameters can be designed to optimize the production of one or more alcohols. In some embodiments, an electric potential is applied across photocathode 120 and anode 131. For example, the electric potential can be between about −0.2V and −0.85V as compared to a SHE; preferably, in some embodiments, the electric potential can be between about −0.35 V and −0.55V. The flow rate of the first electrolyte solution can be between about 0.2 mL/hr*$cm^2$ and 20 mL/hr*$cm^2$. The flow rate of the second electrolyte solution can also be between about 0.2 mL/hr*$cm^2$ and 20 mL/hr*$cm^2$. In some embodiments, the first electrolyte solution and the second electrolyte solution can comprise an aqueous solution of sodium bicarbonate. Other electrolytes include sodium sulfate, potassium sulfate, potassium bicarbonate, and/or calcium bicarbonate. In some embodiments, concentrations of the electrolyte are between 0.01M to 1M, and preferably of 0.1M to 0.5M. In some embodiments, the system can be operated at ambient temperature and pressure. For example, the system can operate at a temperature between 15° C. and 50° C., such as about 20, 25, 30, 35, 40, or 45° C., or any other value therebetween. In addition, the system absolute pressure can be between 0.7 atm and 7 atm, such as 1, 2, 3, 4, 5, or 6 atm, or any other value therebetween.

Figure 5:
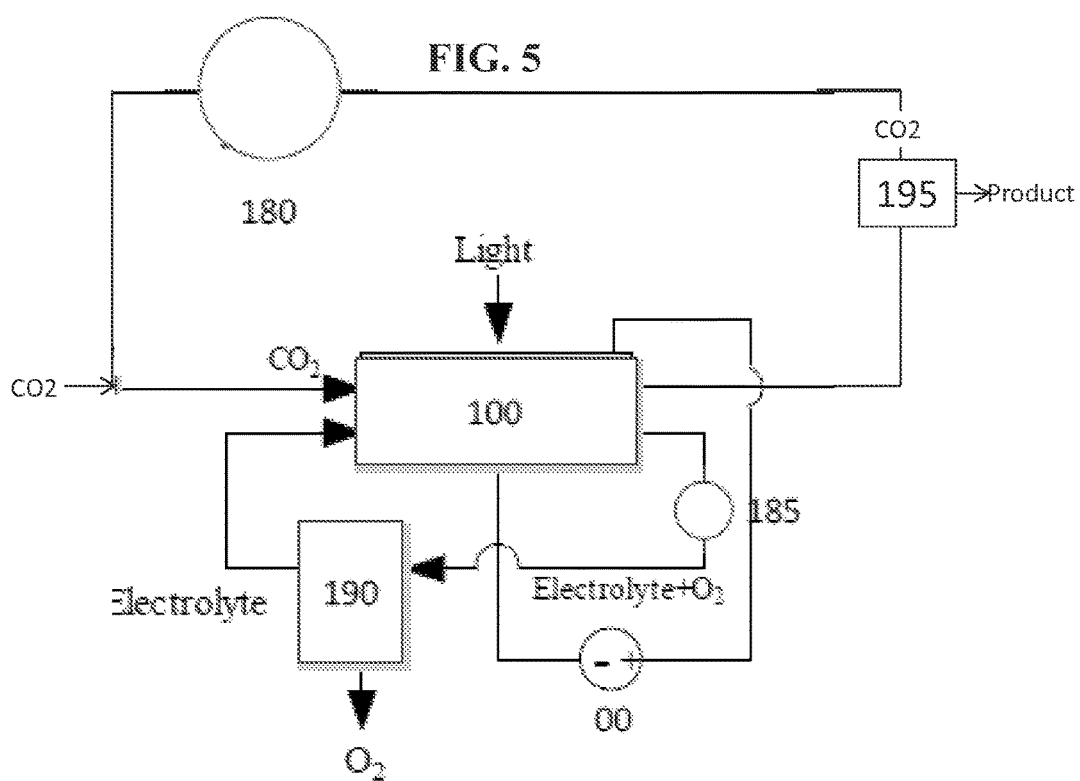
FIG. 5 is a schematic representation of an embodiment of a photoelectrochemical system.

FIG. 5 depicts a system where gaseous $CO_2$ flows into the cathode chamber. Thus, a gas transfer unit can be omitted. As shown, the system can comprise: a dual-chamber PEC device 100 comprising a cathode chamber and an anode chamber; a power source 00 to supply an electric potential across the photocathode and the anode; and optionally, an alcohol storage tank (not shown) for storing the generated alcohol. Moreover, some embodiments can further comprise gas isolation unit 190 downstream from the anode chamber to isolate the generated $O_2$ from the second electrolyte solution. In addition, pump can be configured to pump the second electrolyte solution from the anode chamber to gas isolation unit 190 and upon extraction of $O_2$, recycle the second electrolyte solution back to the anode chamber via a second electrolyte return conduit 8.

With reference to FIG. 2C, cathode chamber 110 can comprise first inlet 112 through which gaseous $CO_2$ flows into first channel 114 and first outlet 113, through which one or more alcohols, e.g., gaseous methanol, ethanol, propanol, and/or butanol, flows out of first channel 114. (It should be understood that cathode chamber 110 depicted in FIG. 2C can also be incorporated into the systems represented in FIG. 4 as described above.) To facilitate proton transfer, photocathode 120 is porous, such as a screen or mesh, and extends alongside and is disposed near proton conducting membrane 150. In some embodiments, photocathode 120 and proton conducting membrane 150 are in direct contact with each other. Liquid proton conducting material, such as Liquid Nafion®, can be used during the making of device 100 to provide good contact between photocathode 120 and proton conducting membrane 150. With this configuration, first channel 114 is partially defined by two opposing surfaces, namely, transparent cover 111 comprising the first surface and photocathode 120 and proton conducting membrane 150 comprising the second surface.

In addition, cathode chamber 110 can be configured such that generated alcohol products are isolated from the vapor phase. For example, in some embodiments, the vapor phase comprising MeOH and $H_2O$ can be directed from the reactor to a two stage condenser, the first stage removing the water and the second stage will condense the MeOH. For example, in other embodiments, the vapor phase comprising $H_2O$ and one or more of MeOH, EtOH, and PrOH can be directed from the reactor to a two stage condenser, the first stage removing the water and the second stage will condense the one or more of MeOH, EtOH, and PrOH.

A method of converting carbon dioxide to alcohol can comprise introducing gaseous $CO_2$ into a continuously flowing system, e.g., a system as depicted in FIG. 5 and described herein. Again with reference to FIG. 2C, the initial steps comprise pumping $CO_2$, e.g., $CO_2$ in a gaseous state, into cathode chamber 110 with photocathode 120. At least a portion of photocathode 120 is covered in a shallow bath of a first electrolyte solution and is being irradiated. Concurrently, a second electrolyte solution is being pumped into anode chamber 130, and as described herein, cathode chamber 110 and anode chamber 130 are separated by a proton conducting membrane.

In some embodiments, the vapor phase with generated alcohol can be pumped into an alcohol isolation unit from cathode chamber 110. In the alcohol isolation unit, a substantial portion of the alcohol is extracted from the water. Once extracted, the recovered water can optionally recycle into cathode chamber 110 to maintain the electrolyte concentration. In other embodiments, cathode chamber 110 is configured such that the gaseous/vapor product that flows out the first outlet 113 is a high percentage of alcohol, e.g., greater than 50%, 60%, 70%, 80%, 90%, 95%, or more, and does not require a subsequent process to further purify the reaction product.

Similarly, in some embodiments, the second electrolyte solution can be pumped from anode chamber 130 into a gas isolation unit. In the gas isolation unit, a substantial portion of the $O_2$ generated in anode chamber 130 is extracted from the second electrolyte solution. Once extracted, the recovered second electrolyte solution can recycle to anode chamber 130.

The process conditions and parameters can be designed to optimize the production of alcohols, such as methanol, ethanol, propanol, butanol, or various combinations thereof. In some embodiments, an electric potential is applied across an electrical connection between the photocathode and the anode. For example, the electric potential can be between about −0.2 V and −0.85V as compared to a standard hydrogen electrode; preferably, in some embodiments, the electric potential can be between about −0.35 V and −0.55V, such as 0.4, 0.45, or 0.5V, or any other value therebetween. The flow rate of the second electrolyte solution is between about 0.2 mL/hr*cm$^2$ and 20 mL/hr*cm$^2$. In some embodiments, the first electrolyte solution and the second electrolyte solution can comprise an aqueous solution of sodium bicarbonate. Other electrolytes include sodium sulfate, potassium sulfate, potassium bicarbonate, and/or calcium bicarbonate. In some embodiments, concentrations of the electrolyte are between 0.01M to 1M, and preferably of 0.1M to 0.5M. In some embodiments, the system can be operated at ambient temperature and pressure. For example, the system can operate at a temperature greater than 70° C. but less than 100° C. In addition, the system pressure is between 0.7 atm and 10 atm.

Another aspect of the disclosure involves regenerating an electrode as described herein, because the $Cu_2O$/CuO photocathode 120 performance may degrade with time. The degradation may be due to, at least in part, the loss of $Cu_2O$ by photo corrosion. However, the nanostructure of CuO does not significantly change over the course of use. As such a method can comprise replenishing the $CuO_2$ on the nanorod array by repeating the electrodeposition of the $Cu_2O$. This can be done in situ without having to disassemble the cell. For example, an electrolyte containing copper sulfate can be pumped continuously into the cell. A potential is applied to the cell to drive the electro deposition process. Electric potential values are similar to the original deposition process. To minimize electrodeposition in unwanted areas, a masking agent can be used. For example, the copper electrode surface that faces away from the light source can be coated with a non-conducting layer (like a paint or film of some kind) to prevent deposition on that side and force the deposition on the side facing the light. In some embodiments, electrodeposition to replenish is performed during low light hours or periods of nonuse, such as at night when no sunlight is available to drive the reaction.

While the present disclosure is described with reference to $CO_2$ to generate alcohols, such as methanol, ethanol, propanol, butanol or various combinations thereof. It is to be understood that other redox reactions can be performed with PEC devices in accordance with the present disclosure. For example, other reactions for which the presently described invention can be useful for includes converting $CO_2$ to formate (HCOO$^-$), $CO_2$ to methane ($CH_4$), $CO_2$ to ethane ($C_2H_4$), and $CO_2$ to propane ($C_3H_8$).

Another aspect of the disclosure comprises methods of making the nanostructure array. In some embodiments, a nanostructure array can be prepared forming or applying CuO nanostructures on a surface and electrodepositing $Cu_2O$ particles on the CuO nanostructures. The surface can be cleaned before applying or forming the CuO nanostructures. In some embodiments, CuO nanostructures are formed by heating the Cu component to a temperature between 150° C. and 500° C., such as 160, 170, 180, 190, 200, 210, 220, 230, 240, 250, 260, 270, 280, 290, 300, 320, 340, 350, 360, 380, 400, 420, 440, 460, 480, or 490, or any value other therebetween. In other embodiments, the CuO nanostructures can be formed by first forming $Cu(OH)_2$ nanostructures on the surface and then heating the Cu component to a temperature between 150° C. and 250° C., such as 160, 170, 180, 190, 200, 210, 220, 230, or 240, or any other value therebetween. Once the CuO nanostructures are formed, the $Cu_2O$ particles can be electrodeposited on the CuO nanostructures by placing the Cu component in an electrolytic bath comprising cupric ions. In various embodiments, a time for electrodepositing $Cu_2O$ particles on the CuO nanostructures is less than 15 minutes. The electrolytic bath can comprise a basic aqueous solution of cupric ions with a stabilizing agent. The stabilizing agent can be an organic acid, e.g., lactic acid, tartaric acid, malic acid, citric acid, oxalic acid, polyethylene glycols (PEGs), boric acid, sulfonic acid, and thiourea. The pH of the solution can be between 7 and 12, preferably 8 to 10. Other additives can also be added. Further information regarding electrodeposition solutions and conditions can be found in Modern Electroplating, J. Wiley and Sons, p. 33-78: "2: Electrodeposition of Copper" by Dini and Snyder (2010).

EXAMPLES

The present invention(s) will be described in greater detail by way of specific examples. The following examples are offered for illustrative purposes only, and are not intended to limit the invention(s) in any manner. Those of skill in the art will readily recognize a variety of noncritical parameters which can be changed or modified to yield essentially the same results. Descriptions of the methods used in the described examples is also provided.

Example 1

Preparation of a CuO & $Cu_2O$ Nanorod Array Photocathode by a Thermal Procedure to Form CuO Array In the first step of preparing a nanorod array in accordance with the present disclosure, a CuO nanorod array was formed by a thermal procedure. Specifically, the CuO rods were grown on a copper foil substrate. First, Cu foil was cut to size and was cleaned by immersing in a 1.0M $H_2SO_4$ solution, then sonicated in isopropanol, acetone, and deionized water, respectively, and finally, dried under nitrogen gas.

Next, the CuO nanorods were then grown on the freshly cleaned Cu substrate by a thermal procedure in accordance with the reference: X. Jiang, T. Herricks, and Y. Xia, *Nano Letters*, 2002, 2, 1333, which is hereby incorporated by reference in its entirety. The copper foil was isothermally heated at 400° C. for 4 hours. A temperature program was used and comprised first heating the sample up to 400° C. (at 25° C./min). After 4 hours of isothermal heating, the sample was allowed to return naturally to room temperature.

After the CuO nanorod array was formed, the $Cu_2O$ shell was formed by cathodic electrodeposition on the CuO array using a potentiostat (CH electrochemical workstation 720C) at −0.2V vs. SHE in 0.4M $CuSO_4$ +3M lactic acid, pH 9 (through addition of a concentrated NaOH solution) at 60° C. for 1 min., 5, min., 10 min., 15 min., 25 min., or 30 min. The thickness of the $Cu_2O$ generally increased with an increase in electrodeposition time. For example, the average nanorod diameter for the deposition time of 10 min. was 0.8-1.0 μm and for 30 min. was 1.5-2.0 μm. As compared to a flat sheet, the nanorod arrays provided a surface aspect ratio enhancement factor of 7-8. Table 1 below provides the nomenclature of the types of films prepared:

TABLE 1

CuO/$Cu_2O$ nanorod photoelectrodes prepared by a two-step strategy, (TH and ED) along with the respective parent materials

| Photoelectrode name | 1) Thermal oxidation (TH) | 2) Electrodeposition of $Cu_2O$ (ED) for selected periods of time |
|---|---|---|
| TH/ED1 | Cu foil heated at 400 C. 4 h | $Cu_2O$ electrodeposited for 1 min |
| TH/ED5 | Cu foil heated at 400 C. 4 h | $Cu_2O$ electrodeposited for 5 min |
| TH/ED10 | Cu foil heated at 400 C. 4 h | $Cu_2O$ electrodeposited for 10 min |
| TH/ED15 | Cu foil heated at 400 C. 4 h | $Cu_2O$ electrodeposited for 15 min |
| TH/ED25 | Cu foil heated at 400 C. 4 h | $Cu_2O$ electrodeposited for 25 min |
| TH/ED30 | Cu foil heated at 400 C. 4 h | $Cu_2O$ electrodeposited for 30 min |
| TH | Cu foil heated at 400 C. 4 h | N/A |
| ED30 | N/A | $Cu_2O$ electrodeposited for 30 min |

Figure 6A:
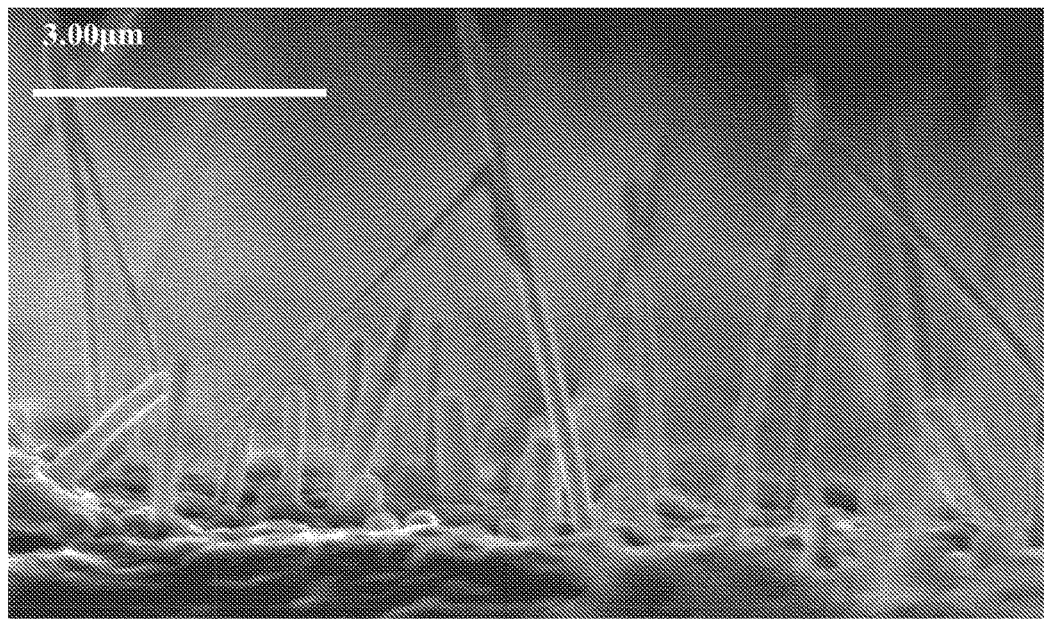
FIGS. 6A-6E are SEM images of $CuO/Cu_2O$ nanorods arrays obtained by a $Cu_2O$ electrodeposition coating on thermally grown CuO nanorods for 1 min. (a), 10 min. (b) and 30 min. (c), respectively. Thermally grown CuO nanorods (indicated as TH) were used as substrate for the preparation of the respective hybrids (d). Electrodeposited $Cu_2O$ (indicated as ED) on Cu foil without a pre-thermal treatment is included for comparison (e). In all cases, CuO nanorods were grown isothermally (400° C., 4 h.).
Figure 6B:
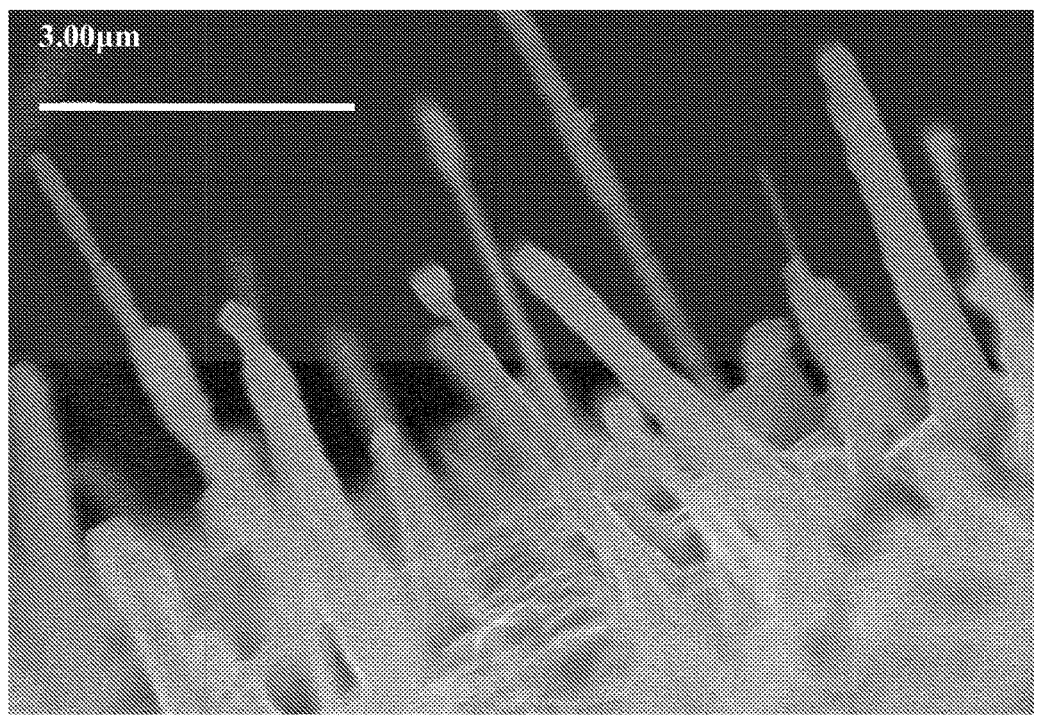
Figure 6C:
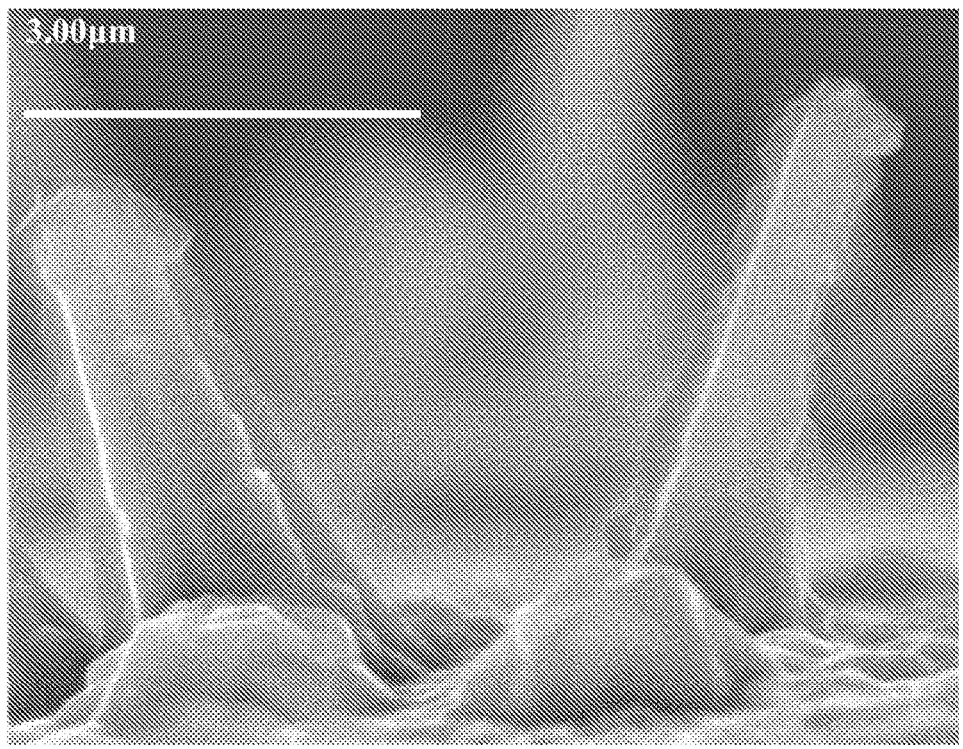
Figure 6D:
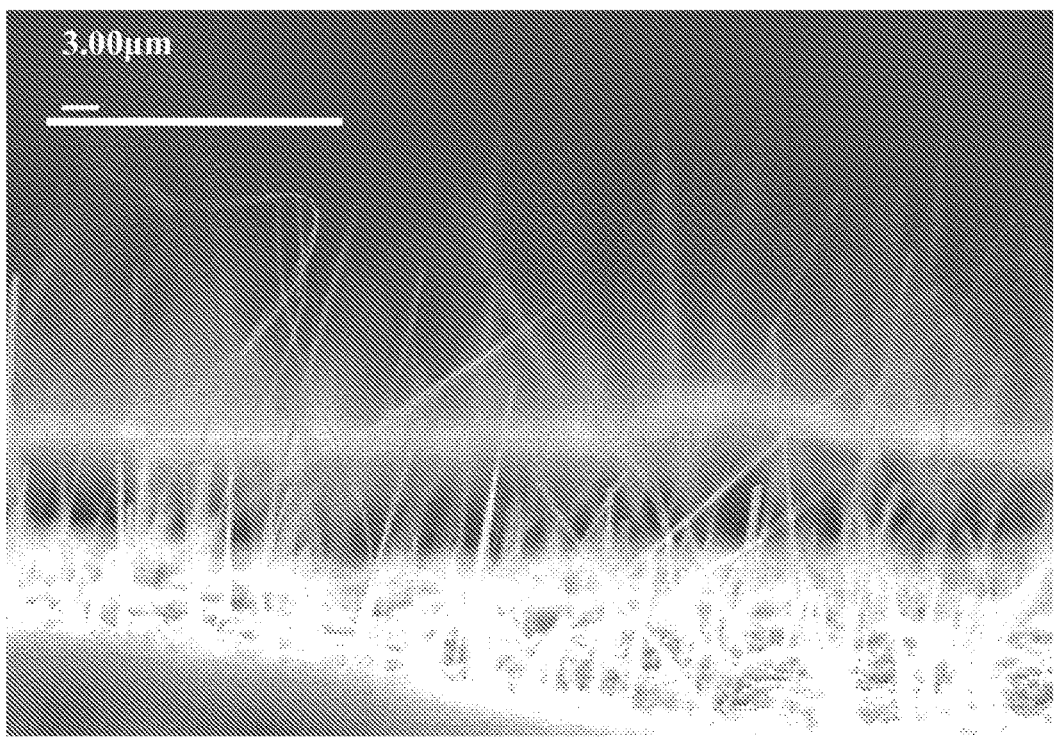
Figure 6E:
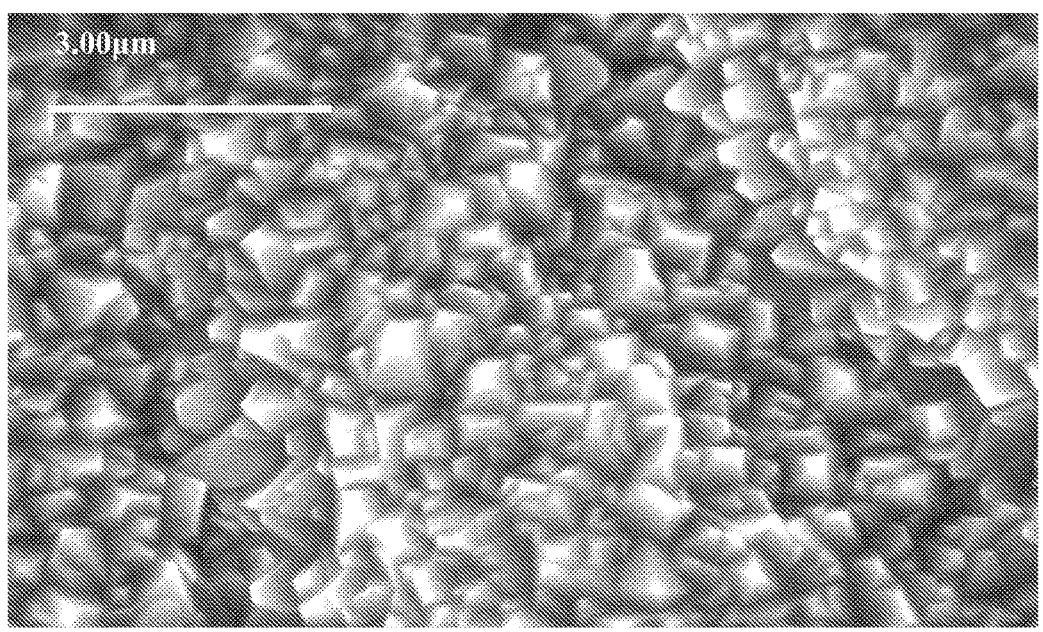

FIGS. 6A to 6C are SEM images of CuO/$Cu_2O$ nanorod arrays obtained by a $Cu_2O$ electrodeposition coating on thermally grown CuO nanorods for 1 min., 10 min., and 30 min, respectively. FIG. 6D is an SEM image of thermally grown CuO nanorods used as a substrate for the preparation of the CuO/$Cu_2O$ nanorod arrays. FIG. 6E is an SEM image of $Cu_2O$ electrodeposited on a Cu foil without a pre-thermal treatment (hereinafter "ED30"). As depicted, the larger surface area of the CuO nanorod array (depicted in FIG. 6D) as compared to Cu foil allows for much more $Cu_2O$ to be electrodeposited. Cf FIG. 6A to 6C to FIG. 6E.

Figure 7:
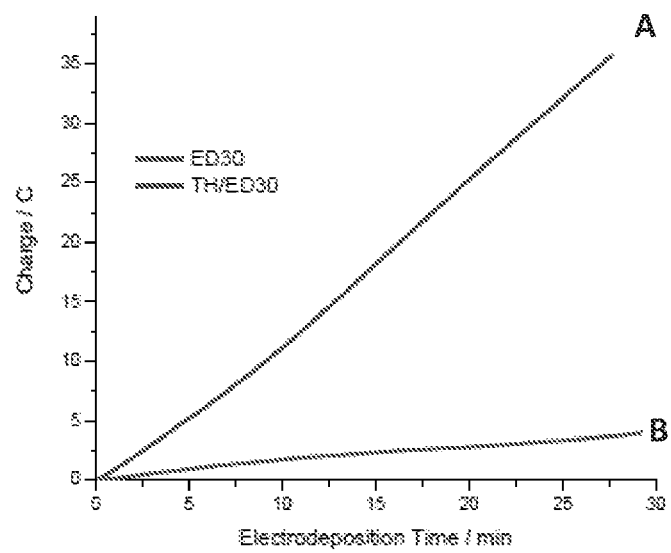
FIG. 7 shows the charge evolution during 30 min. electrodeposition of $Cu_2O$ on freshly polished Cu foil (ED30) and on thermally oxidized Cu foil (TH/ED30) at $-0.20$ V vs. SHE using a solution containing 0.4 M $CuSO_4$ and 3 M lactic acid adjusted to pH 9.

FIG. 7 compares the charge evolution associated with $Cu_2O$ electrodeposition (t=30) on the two contrasting substrates: CuO nanorods (Line A) vs. a flat Cu foil surface (Line B). Note that the electrodeposition charge varies almost linearly with time for both substrates. This indicates that the $Cu_2O$ is able to be continuously electrodeposited on the thermally treated foil in spite of its semiconductor nature (i.e., CuO is a p-type semiconductor). The morphology of the resulting films can be seen in FIGS. 6C and 6E.

Figure 8:
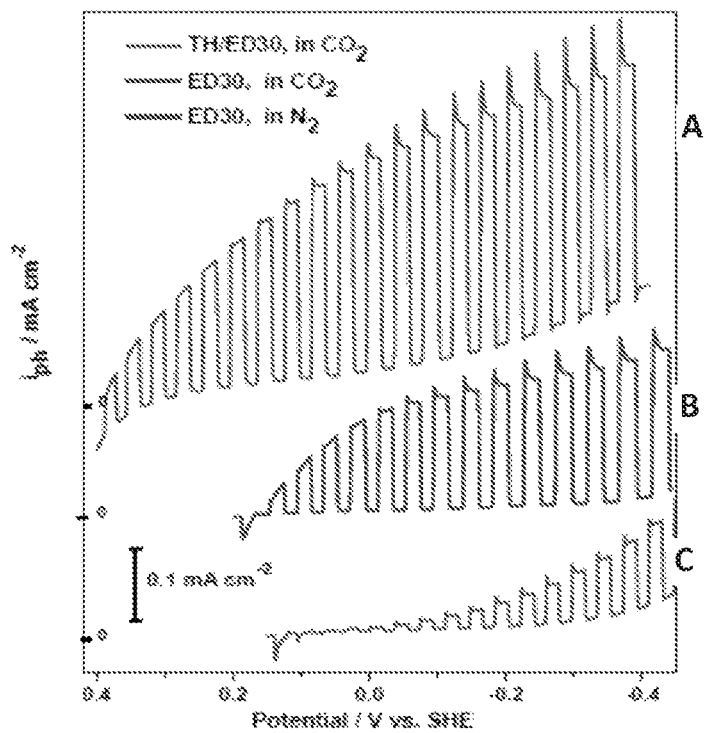
FIG. 8 shows a comparison of PEC activity for TH/ED30 nanorod film (A trace) vs. an electrodeposited ED30 electrode (B trace) in $CO_2$-saturated 0.1M $Na_2SO_4$ aqueous solution. The PEC activity for electrodeposited (ED30) in $N_2$-saturated solution (C trace) is also included for comparison.

FIG. 8 compares the photocurrent/potential profiles of a CuO/$Cu_2O$ nanorod film (t=30, Trace A) and $Cu_2O$ electrodeposited on an ED30 film (t=30 min, Trace B) in $CO_2$ saturated 0.1M $Na_2SO_4$ aqueous solution. The corresponding profile for an electrodeposited ED30 film in $N_2$ saturated solution under the same conditions is included as a control (Trace C). As shown, the CuO/$Cu_2O$ nanorod film outperformed the ED30 film throughout the tested potential range. In addition, the photocurrent onset potential was ~0.25V more positive for the CuO/$Cu_2O$ nanorod film than for the $Cu_2O$-only film in the presence of $CO_2$. The photocurrent/potential profiles of a $Cu_2O$-only film also show a significant increase of photocurrent in the presence of $CO_2$ and also a positive shift of the photocurrent onset potential threshold. At −0.25V vs SHE, the photocurrent in the presence of $CO_2$ was approximately 3.2 times higher than in the presence of $N_2$, and was reaching factors of 6-7 at less negative potentials, thus indicating that $CO_2$ is a much better electron scavenger (capturing the photoelectrons from $Cu_2O$) than water.

Figure 9A:
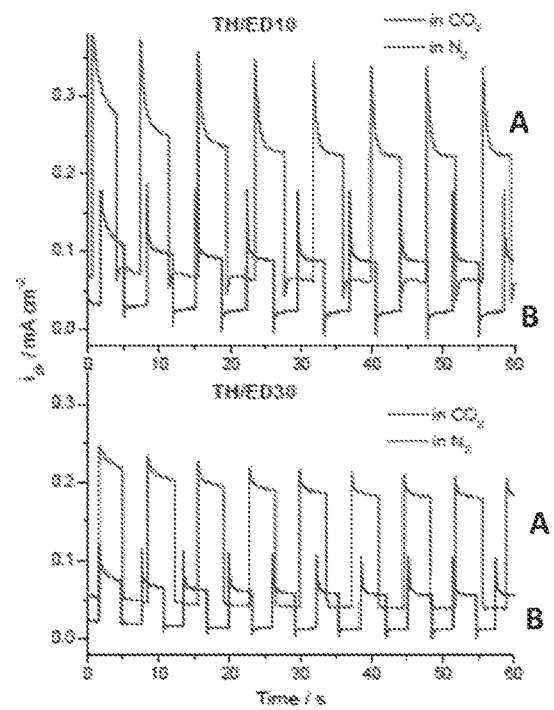
FIG. 9A shows photocurrent transients at $-0.1$ V (vs. SHE) of $Cu_2O/CuO$ hybrid nanorod arrays under manually-chopped simulated AM1.5 illumination (70 mW $cm^{-2}$) for TH/ED10 and TH/ED30 electrodes in $N_2$-(B traces) and $CO_2$-saturated (A traces) aqueous solution containing 0.1 M $Na_2SO_4$ as electrolyte.
Figure 9B:
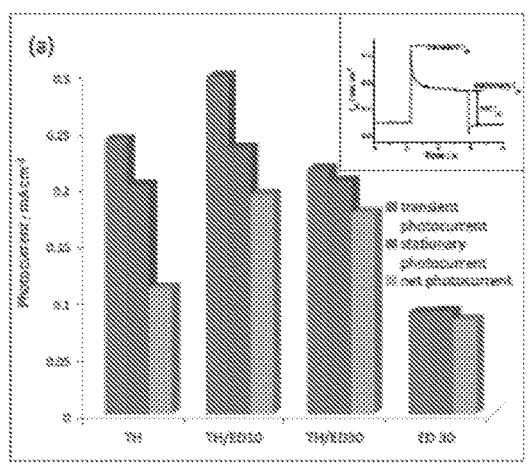
FIG. 9B is a comparative bar diagram of transient, stationary and net photocurrent for TH, TH/ED10, TH/ED30 and ED30 photocathodes in $CO_2$-saturated 0.1 M $Na_2SO_4$ as electrolyte. Applied potential=$-0.1$ V vs. SHE. Illumination=AM1.5 solar simulator. The inset clarifies the nomenclature for transient, stationary, and net photocurrent.
Figure 9C:
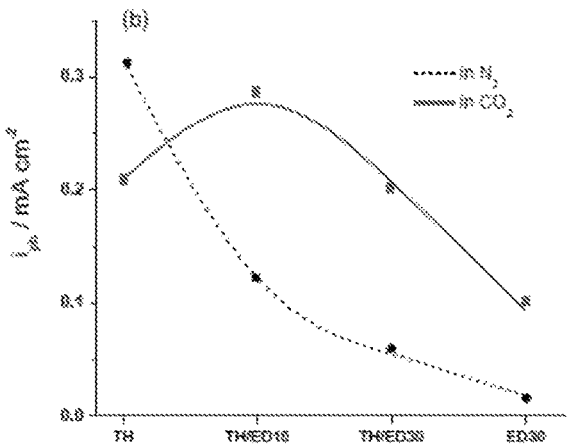
FIG. 9C is a comparative plot of stationary photocurrent for TH, TH/ED10, TH/ED30 and ED30 under $N_2$ (dash line) and $CO_2$ (solid line), respectively.

FIGS. 9A-9C compare the PEC performance of the various photocathodes at −0.1V vs. SHE under manually chopped AM 1.5 simulated solar illuminations in $CO_2$- and $N_2$-saturated solutions. A Pt foil and a Ag/AgCl (satd. KCl) were used as the anode and reference electrode respectively. FIG. 9A compares CuO/$Cu_2O$ photocathodes prepared with different electrodeposition times (10 min. v. 30 min.). As shown, the photocurrent transients for the CuO/$Cu_2O$ nanorod films in the presence of $CO_2$ (Trace A) are ~3 times greater than those in the presence of $N_2$ (Trace B). The photocathode with an electrodeposition time of 10 minutes was found to be the best performing for the photoelectroreduction of $CO_2$, although the photocurrent transients have relatively higher spikes than the photocathode with an electrodeposition time of 30 minutes.

FIG. 9B is a comparative bar diagram of transient, stationary and net photocurrent (presented left to right) for TH, TH/ED10, TH/ED30 and ED30 photocathodes in a $CO_2$-saturated environment. The CuO/$Cu_2O$ nanorod arrays show enhanced photocurrent in $CO_2$ saturated solutions with respect to the TH film, pointing to efficient removal of photogenerated electrons from $Cu_2O$ to the CuO core. In addition, for PEC generation of $H_2$, the thermal film performs the best and specially at negative applied potentials (data not shown).

FIG. 9C compares stationary photocurrent at −0.1 V for $CO_2$ and H+ photoelectrochemical reduction: the TH films yielded higher photocurrent than any of the TH/$ED_t$ (t varied between 1 and 30 min.) counterparts for $H_2$ evolution, but the TH films progressively deteriorated in their PEC performance as the CuO nanorods became covered by electrodeposited $Cu_2O$.

Example 2

Preparation of a CuO & $Cu_2O$ Nanorod Array Photocathode

Figure 12A:
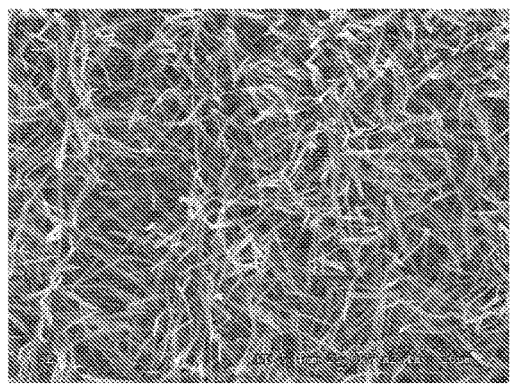
FIGS. 12A-12B are SEM images of CuO nanorod arrays subject to soaking times of 50 min. (left) and 80 min. (right).
Figure 12B:
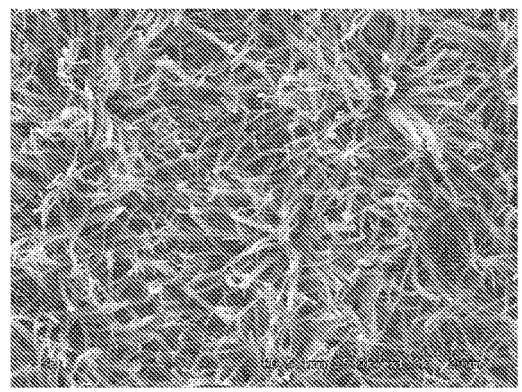

The CuO/$Cu_2O$ nanorod arrays were fabricated by a two-step process performed on freshly cleaned copper as described in Example 1. However, this procedure deviates from Example 1. In the first step, freshly cleaned Cu substrates were immersed in the mix solution 8.0 mL of the NaOH solution (10 M), 4.0 mL of a $(NH_4)_2S_2O_8$ solution (1.0 M), and 18.0 mL of water. A few minutes later, a blue color appeared on the copper foil surface, and the solution became increasingly blue. In 15 minutes, a light-blue film covered the copper foil surface. The copper foil was taken out of the solution, rinsed with water, and dried in air. The $Cu(OH)_2$ fibers and scrolls were converted CuO by thermal oxidation in presence of air using a box furnace for 1 h. at 200° C. (at 25°/min.), the temperature was allowed to return naturally to room temperature. Longer soaking times in the solution were also performed (50 min. and 80 min.) and produced the denser CuO nanorod structures shown in FIGS. 12A and 12B. Thus, longer soaking times may be preferred.

Figure 13A:
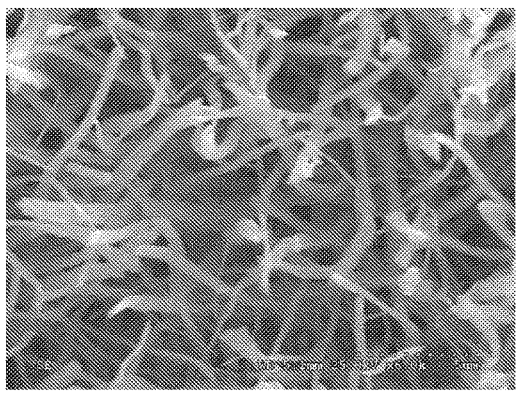
FIGS. 13A-13F are SEM images of nanorod arrays.
Figure 13B:
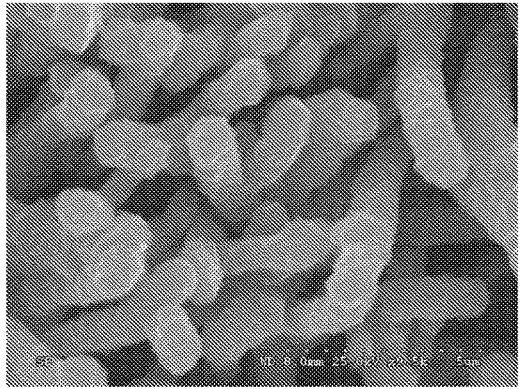
Figure 13C:
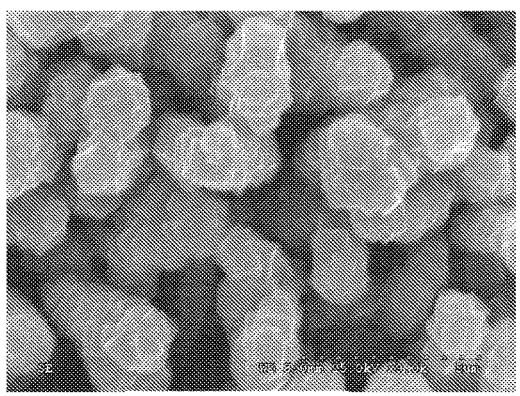
Figure 13D:
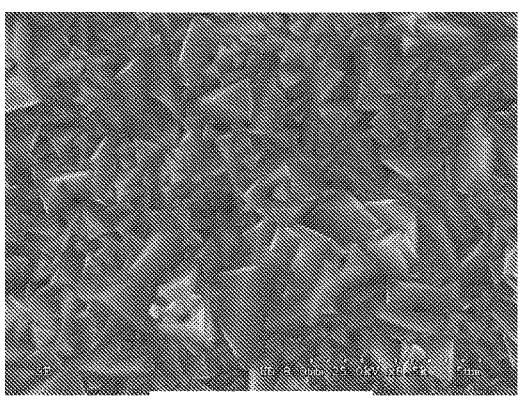
Figure 13E:
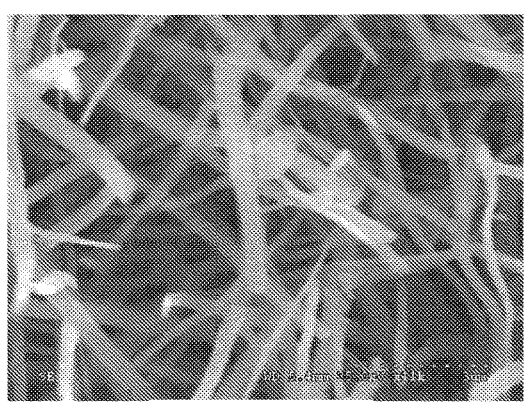
Figure 13F:
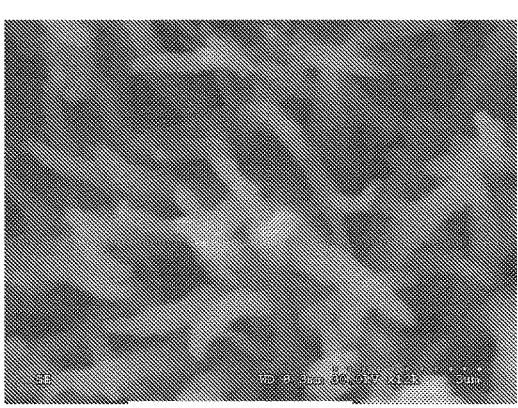

In the second step, $Cu_2O$ crystallites were electrodeposited on the thermally grown CuO nanowires from a basic solution of lactate stabilized copper sulfate using a potentiostat (CH electrochemical workstation 720° C.) at constant potential [−0.4 V vs Ag/AgCl (satd. KCl)]. The electrolytic bath was prepared with deionized (DI) water and contained 0.4 M cupric sulfate and 3 M lactic acid. The bath pH was adjusted to 9 by addition of concentrated NaOH solution; the temperature of the bath was maintained at 60° C. during electrodeposition. Deposition times should be selected to deposit the desired amount of crystallites on the nanorod without degrading or destroying the nanorod structure. FIGS. 13A to 13E show a CuO nanorod array formed from an 80 minute soak, as described above (FIG. 13A); a $CuO/Cu_2O$ nanorod array formed from an 80 minute soak and a 15 minute deposition time (FIG. 13B); a $CuO/Cu_2O$ nanorod array formed from an 80 minute soak and a 20 minute deposition time (FIG. 13C); a $CuO/Cu_2O$ nanorod array formed from an 80 minute soak and a 30 minute deposition time (FIG. 13D); a $CuO/Cu_2O$ nanorod array formed from an 50 minute soak (FIG. 13E); and a $CuO/Cu_2O$ nanorod array formed from an 50 minute soak and a 10 minute deposition time (FIG. 13F).

Example 3

Converting $CO_2$ to Methanol with the Photocathode

Photoelectrosynthesis of $CH_3OH$ was demonstrated with a TH/ED10 CuO/Cu2O nanorod photoelectrode. A Pt foil and an Ag/AgCl (satd. KCl) were used as the anode and reference electrode respectively.

Figures 10A, 10B:
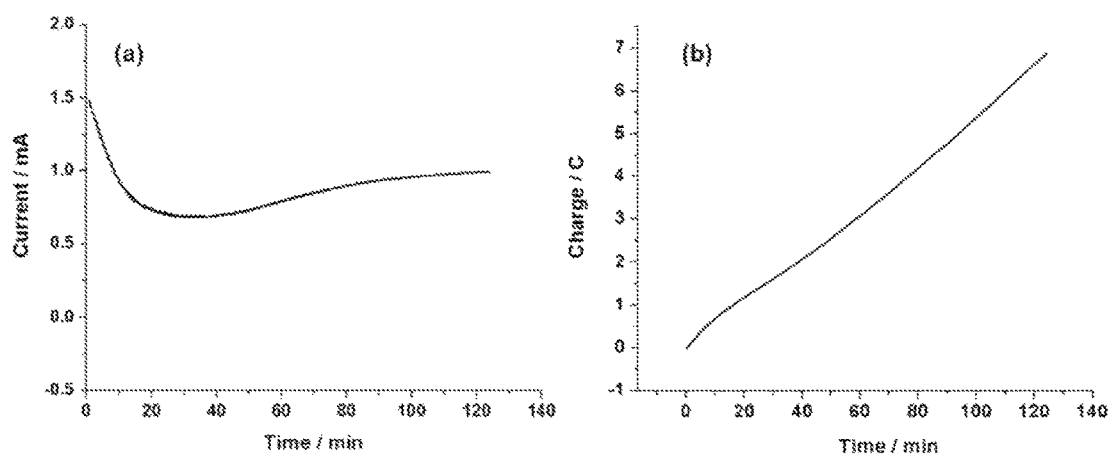
FIGS. 10A-10B show current/time (a) and charge/time (b) profiles under continuous solar irradiation at $-0.2$ V vs. SHE in a sealed dual-chamber photoelectrochemical cell containing a TH/ED10 nanorod photocathode. Electrolyte was 0.1 M $NaHCO_3$ saturated with $CO_2$ and maintained at room temperature.

The photoelectrode was placed in 100 mL electrolyte solution saturated with $CO_2$, polarized at −0.2 V vs. SHE, and continually irradiated with visible light provided by a AM1.5 solar simulator. The irradiated electrode area was approximately 3 $cm^2$. Representative photocurrent/time and charge/time profiles recorded during the photoelectrolysis are shown in FIGS. 10A and 10B respectively. To analyze the photoelectrogenerated product, liquid samples were periodically withdrawn from the photoelectrochemical cell. A gas chromatograph equipped with a mass spectrometer (GC-MS) was used to detect methanol. Methanol photogeneration was monitored at m/z=31 ($CH_2OH+$) and was found to reach a concentration of approximately 85 μM after 90 min. of irradiation. Faradaic efficiencies were in the 94-96% range (considering that 6 e- are required to form one molecule of $CH_3OH$ from $CO_2$). Note that a potential of −0.2 V vs. SHE represents an "underpotential" greater than at least 150 mV given that the standard potential for the $CO_2/CH_3OH$ redox process lies at −0.38 V vs. SHE at pH 7.

FIG. 10A depicts that the photocurrent decreases during the first 30 min. and then recovers to reach a constant value of 1.05 mA at ~2 h of irradiation. Even if some photocorrosion had occurred leading to formation of metallic copper on the electrode surface, this process did not diminish the performance of the $CuO/Cu_2O$ photoelectrodes. Note, that dark current values at least an order of magnitude lower (0.10 mA) than the photocurrent level corroborate that the electrode remained photoactive throughout the photoelectrolysis duration.

Example 4

System for Converting $CO_2$ to Methanol

A microchannel gas transfer unit was constructed with the configuration shown in the cross section view in FIG. 3A. The gas transfer unit was composed of a thin polymer membrane sandwiched between two plastic plates that contain microchannels with 250 μm depth and 500 μm width. These plates are referred to as membrane contactors. The membrane was prepared by taking a raw PTFE sheet and stretching it over a membrane contactor until it becomes very thin (nearly transparent). The thickness was estimated to be 10 μm or less. The membrane was hydrophobic with a water contact angle greater than 130°. These properties (very thin but hydrophobic) allowed the $CO_2$ to move rapidly to the electrolyte but prevent the electrolyte from flowing into the $CO_2$ gas channel. Thus, this construct rapidly transferred $CO_2$ to the flowing liquid stream with a small reactor volume.

A cathode reactor was constructed with the configuration of the cathode chamber is shown in FIG. 2A. The cathode reactor consisted of a transparent cover of quartz. The channel was formed using a Kapton spacer (50 μm thick) with a diamond shaped cutout. The electrode was composed of a copper foil coated with $Cu_2O$ layer as described in Example 1 and shown in FIG. 2A. The area of the photoelectrode was 3.5 $cm^2$. The electrode is connected to the positive terminal of the power supply as indicated in FIG. 3.

The anode chamber was configured to allow protons to move from the counter electrode to the working electrode stream but impede the transfer of MeOH to the counter electrode stream. A Pt foil was used as the anode. An H-cell was used for the test, where he Pt foil anode was placed on one side while the outlet of the cathode reactor fed into the other side. The two half-cells were separated by a glass frit to prevent the diffusion of the alcohol product to the anode. The reference electrode was placed in the side with the outlet from the cathode reactor. The electrode was connected to the negative terminal of the power supply as indicated in FIG. 3. (In another construction, a Nafion® membrane may be positioned between two membrane contactor plates to separate the working electrode stream and the counter electrode stream. The reference electrode would be placed in the cathode chamber or channel.)

A constant potential of −0.3V was applied to the photoelectrode. The electrolyte was composed of a 0.1M $NaHCO_3$ aqueous solution, and was pumped at the rate of 5 mL/hr. Light was provided by a solar simulator with the power of 2 suns. The process operated at the mild process conditions of 25° C. and 1.0 atm absolute pressure. The experiment was run for around 4 hours. Methanol was collected using u-tube glassware with a glass frit separating the cells. Samples of the product were taken and tested by GC to determine the concentration of MeOH. The calculated MeOH production rate was 0.015 mL/hr*$m^2$.

Example 5

System for Converting $CO_2$ to Methanol

The photoelectrochemical device for this example was constructed similarly to that in Example 4. However, the device was constructed with a configuration as shown in FIG. 2B(i) and used a copper foil with a 2 mm through-hole for the photocathode. The preparation of the photocathode was made in accordance with Example 2. Again, the area of the photoelectrode was 3.5 cm². The anode was composed of graphite. The transparent cover was a 1/16" thick piece of Lexan®. In this case, the reference electrode was placed in the inlet to the working electrode channel.

The same process conditions as described in Example 4 were used to test the constructed system, except the experiment was run for around 1 hour. Samples of the product were taken and tested by GC to determine the concentration of MeOH. The calculated MeOH production rate was 1.95 mL/hr*m².

Example 6

Photocathode Stability Study

Figures 11A, 11B, 11C, 11D:
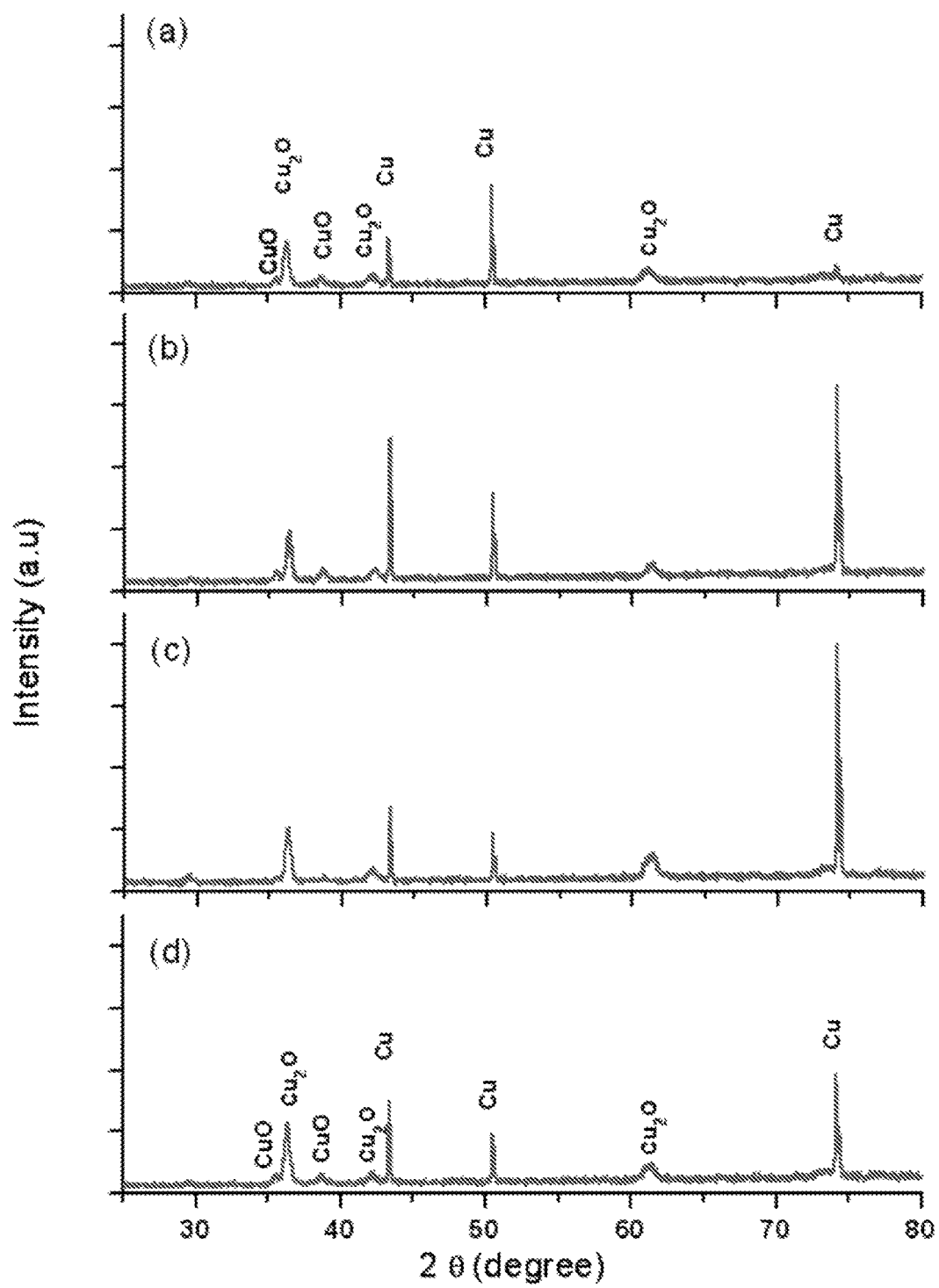
FIGS. 11A-11D show XRD spectras of a TH/ED10 CuO/$Cu_2O$ hybrid nanorod film before (a) and after being subjected to photoelectrolysis at $-0.2$ V vs. SHE in a $CO_2$-saturated aqueous solution for 30 min. (b), 60 min. (c), and 120 min. (d). The $Cu/Cu_2O$ nanorod array was prepared on a copper foil whose XRD peaks are clearly discernible before and after photoelectrolysis.

To link stability with photoactivity of the hybrid nanorod photoelectrode during photoelectrogeneration of methanol from $CO_2$, XRD patterns were obtained as a function of photoelectrolysis time and compared with the pattern for the pristine photoelectrode before irradiation. FIG. 11A shows that before photoelectrolysis, three distinguished crystalline structure are clearly discernible: CuO, $Cu_2O$ and Cu. As the hybrid photoelectrode was prepared from a copper foil, the Cu metal diffractions, associated with the underlying substrate are also seen in the pattern. When the photoelectrolysis duration reaches 30 min, with reference to FIG. 11B, the $Cu_2O$ and CuO peaks remain unchanged while the $Cu^0$ diffraction peaks at 43.2° and 74.1° are higher. This points to incipient formation of metallic Cu from self-reduction of the photoelectrode surface. However, as photoelectrolysis continues, with reference to FIGS. 11C and 11D, the Cu peak located at 74.1° shows the largest variation at times of 60 min. and 120 min. of photoelectrolysis, respectively This peak shows a temporal evolution quite similar to the photocurrent evolution in FIG. 10A. At shorter times (up to 60 min.), the photoelectrode is covered by Cu (due to photocorrosion) but then a "self-healing" process counters metal accumulation; i.e., the metal phase undergoes chemical corrosion to regenerate the oxide phases. The photocurrent-time profile over a 2 hour time frame (FIG. 10A) is also diagnostic of possible slow self-healing of the photocathode assembly as the oxide phases are regenerated when the photoelectrons exit the interfacial phase boundary to $CO_2$. The photogenerated electrons presumably are rapidly transferred to $CO_2$ before they have an opportunity to appreciably photoreduce Cu(I) or Cu(II) in the oxides to the metallic state.

Methods for Measurement of Photolectrochemical Activity

The photocurrent-potential profiles were recorded under solar irradiation (AM1.5) from a solar simulator (Newport 91160-1000). The radiation was interrupted (with a manual chopper) at 0.2 Hz. Bulk photoelectrolysis was also performed in a two-compartment sealed electrochemical cell under continuous light irradiation. The electrolyte used was 0.1M $Na_2SO_4$, the solution was saturated with $N_2$ and $CO_2$ bubbling through the cell. The CH electrochemical workstation 600C was used to apply a constant potential of −0.2V. Light irradiation (AM 1.5) was provided by the full output of the Newport solar simulator specified and with illumination power of 70 mW cm⁻².

Long term photoelectrolysis (FIG. 9) was carried out using a CH electrochemical workstation 600C instrument (www.chinstruments.com), in a custom-designed two-compartment, three-electrode electrochemical cell. Ag/AgCl (satd. KCl) and Pt foil were used as reference electrode and counterelectrode respectively although all potentials are quoted with respect to the SHE reference scale. The electrolyte used were 0.1 M $NaHCO_3$ (saturated with $CO_2$) and 0.1 M $Na_2SO_4$ (saturated with $N_2$) as control experiment.

Physical Characterization

The surface morphology of the various film samples was characterized using a Hitachi S-5000H field emission scanning electron microscope (SEM) operated at an acceleration voltage of 20.0 kV. Raman spectra were recorded with a HORIBA Jobin Yvon LabRam ARAMIS instrument (incident power≤300 mW) using an excitation wavelength of 532 nm and an 1800 line/mm grating. In all the cases the slit width was 10 μm, and 32 scans were accumulated for each spectrum. X-ray diffraction (XRD) patterns were obtained on a Siemens D-500 powder diffractometer using $CuK_\alpha$ as the source radiation.

Gas Chromatography with Mass Spectrometry Detection

Liquid aliquots were periodically taken during the photoelectrolysis to be analyzed in a gas chromatograph equipped with a mass spectrometer as detector (GC-MS). The aliquots were subjected to supporting electrolyte removal by shaking overnight with Amberlite IRN-150 ion-exchange resin (cleaned and vacuum dried just before use) and then injected into the Shimadzu GC-MS 2010SE chromatograph coupled with a MS QP2010 detector and a AOC-20S sampler. Head space sampling was also used for GC-MS analyses to confirm the photoelectrosynthesis of methanol from $CO_2$ by heating the sealed vial at 75° C. water bath for 45 min. to let the liquid and volatile organics equilibrate. The chromatographic column was Shimadzu SHRX105MS (30 m length and 0.25 mm inner diameter, part #220-94764-02) set at 45° C. The MS detector was set at 250° C., and helium was used as the carrier gas. Calibration curves for different methanol concentrations in water showed that the methanol peak eluded at 1.52 min. with a corresponding m/z=31.

A second study was conducted with a microchannel gas transfer unit adapted to produce methanol and other alcohols like ethanol and propanol. This study is described in Examples 7 to 9 below.

Example 7

Preparation of a CuO & $Cu_2O$ Nanorod/Nanoribbon Array Photocathode

The hybrid CuO/$Cu_2O$ photocathodes were fabricated by a three-step process on freshly cleaned copper foil similar to that of Example 2 with some variation. The cleaning procedure consisted of first pretreating these foils with 1.0 M $H_2SO_4$ (Sigma-Aldrich), then subjecting them to successive sonication in isopropanol, acetone and deionized water respectively, and finally drying them under nitrogen gas.

The first step for formation of CuO/$Cu_2O$ nanorod arrays, included the colloidal formation of $Cu(OH)_2$ nanoribbons, in accordance with the references: X. Wen, W. Zhang, and S. Yang, *Langmuir*, 19, 5898 (2003); W. Zhang, X. Wen, S.

Yang, Y. Berta, and Z. L. Wang, *Adv. Matter*, 15, 822 (2003); X. Wen, Y. Xie, C. L. Choi, K. C. Wan, X-Y. Li, and S. Yang, *Langmuir*, 21, 4729 (2005); and X. Chen, L. Kong, D. Dong, G.Yang, L. Yu, J. Chen, and P. Zhang, *J. Phys. Chem. C*, 113, 5396 (2009), which are hereby incorporated by reference in their entirety.

Thus, freshly cleaned Cu substrates were immersed in a mixture of 8.0 mL 10 M NaOH (Sigma-Aldrich)+4.0 mL 1 M $(NH_4)_2S_2O_8$ (Sigma-Aldrich, 99.9% metals basis)+18.0 mL double-distilled water (Corning Megapure). A few minutes later, a blue hue appeared on the copper foil surface, and the solution became increasingly blue thereafter. In 15 min, a light-blue film covered the copper foil surface. The copper foil was taken out of the solution, rinsed with water, and dried in air.

In the second step, the $Cu(OH)_2$ fibers and scrolls were converted to CuO nanoribbons by thermal dehydration in air inside a box furnace for 1-2 h at 200 ° C. (at 10°/min) followed by natural convective cool-down to room temperature. After this step, the copper foil color turned to black.

In the third step, $Cu_2O$ nanocrystallites were electrodeposited on the above-formed CuO nanoribbons by using constant potential [−0.4 V vs Ag/AgCl (satd. KCl)] in a copper sulfate-lactic acid bath. [All potentials are quoted with respect to this reference electrode scale.] The electrolytic bath was prepared with deionized (DI) water and contained 0.4 M copper(II) sulfate (Sigma-Aldrich, 99.9% metals basis) and 3 M lactic acid (Sigma-Aldrich). The bath pH was adjusted to 9 by addition of controlled amounts of conc. NaOH solution; the temperature of the bath was maintained at 60 ° C. during electrodeposition. A Pt foil and a Ag/AgCl (satd. KCl) were used as the counter- and reference electrodes respectively. The electrodeposition time was nominally kept at 10 min.

The chemical preparation (sol-gel) procedure is labeled in what follows as CH τ where CH stands for the chemical formation of $Cu(OH)_2$ during time τ. Similarly, electrodeposited samples are designated ED τ. The number that follows (e.g., CH 15) designates the step duration. Thus "CH 15/ED 10" denotes a sample prepared from sol-gel+thermal anneal (15 min) followed by electrodeposition for 10 min.

Scanning electron microscopy (SEM) (Hitachi S-3000N) and X-ray diffraction (XRD) (Broker Model D8) were used for characterizing the photocathode material at various stages of the preparation sequence.

Example 8

System for Converting $CO_2$ to Methanol

Figure 14:
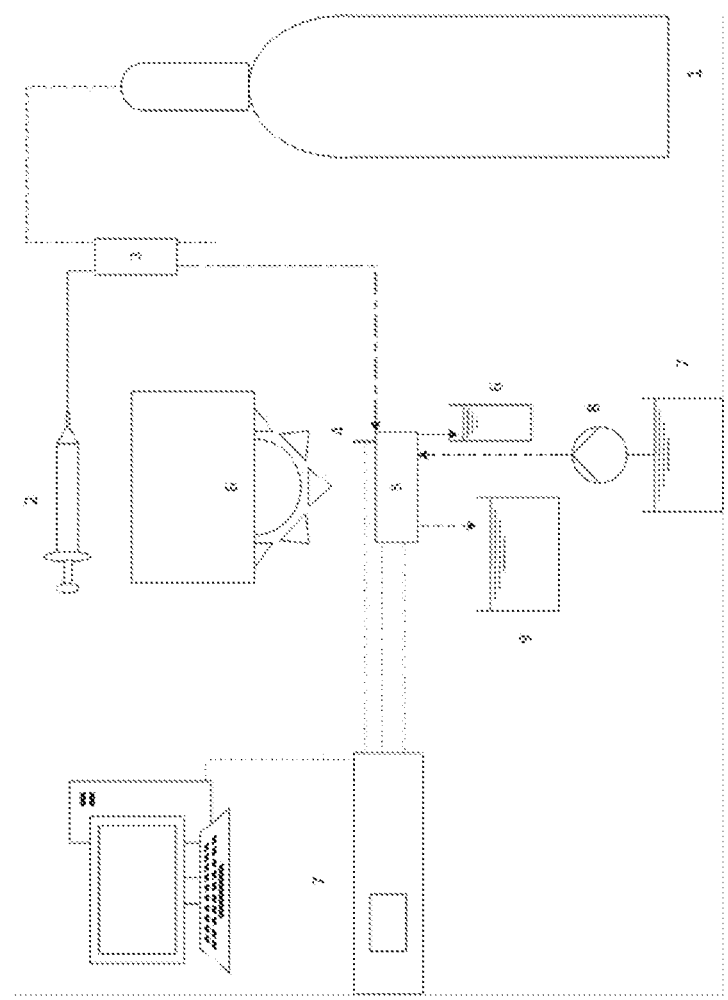
FIG. 14 is a schematic diagram of the Ex. 8 set-up. (1) $CO_2$ tank, (2) Syringe pump, (3) Gas mixing chamber, (4) Reference electrode, (5) the continuous flow reactor of Ex. 8, (6) Solar simulator, (7) Fresh anolyte, (8) Pump, (9) Used anolyte, (10) Electrochemical work station.

A microchannel gas transfer unit adapted for continuous flow was constructed with microchannel continuous flow reactor shown in FIGS. 2B(i) and 2B(ii). A schematic diagram of the complete set-up for photoelectrochemical conversion of $CO_2$ to fuels is shown in FIG. 14. The photocathode was prepared according to Example 7. The supporting electrolyte was sodium bicarbonate (0.1 M) and was pumped to a membrane-based microchannel gas exchanger where the electrolyte was saturated with $CO_2$. The $CO_2$ gas was delivered at 1 atm from a pressurized tank at room temperature, and was dissolved in the electrolyte to a concentration of 0.034 M, corresponding to the maximum solubility of $CO_2$ in water.

A 35 ml syringe was used to deliver the fluid at a 5 ml per hour flow rate via a syringe pump (KD Scientific, Model 200). The $CO_2$ saturated electrolyte was delivered to the cathode compartment located at the top of the microreactor and irradiated with sunlight (AM 1.5) from a solar simulator (Newport Model 91160). The Ag/AgCl/satd. KCl reference electrode also was located at the input to the cathode side and the $CuO/Cu_2O$ hybrid nanorod array supported on copper foil was placed in the cathode compartment. The cathode and anode compartments in the flow cell were separated by an ion exchange membrane (Nafion NER-212), and the flowing electrolyte was collected via sampling ports. The anode was made of stainless steel 378. Electrolyte for the anode side was pumped to the bottom of the reactor where the anode was located and then delivered to the anolyte collector. The anolyte flow rate was also 5 ml per hour.

Example 9

Photochemical Performance of the CuO & $Cu_2O$ Nanorod/Nanoribbon Array Photocathode The photoelectrochemical performance of the hybrid $CuO/Cu_2O$ nanorod arrays prepared in Example 7 and utilized in Example 8 was evaluated using a CH Instruments electrochemical workstation Model 600C instrument, in a custom-designed two-compartment, three-electrode electrochemical cell. The reference electrode and counterelectrode respectively in these experiments were Ag/AgCl (satd. KCl) and Pt foil; the electrolyte was 0.1 M $NaHCO_3$. Solutions were saturated with $N_2$ or $CO_2$ as needed by continual bubbling through the sealed cell. The photocurrent-potential profiles were recorded under simulated solar irradiation (AM 1.5) using the same set-up described earlier. The radiation was interrupted (with a manual chopper) at 0.2 Hz. Bulk photoelectrolysis was also performed in a two-compartment sealed electrochemical cell under continuous light irradiation. A constant potential of −0.3 V was applied to the electrodes. Light irradiation (AM1.5) was provided by the full output (70 mW $cm^{-2}$) of the Newport solar simulator specified above.

Product Detection. Gas chromatography-mass spectrometry (GC-MS) was used to monitor the conversion of $CO_2$ to organic products. Liquid aliquots were extracted from the continuous flow reactor (Example 8) and injected (1 µL) into the GC-MS instrument. A Shimadzu GC-MS-2010SE chromatograph with a MS QP2010 detector and an AOC-4 20S autosampler was used for this purpose. The chromatographic column was Shimadzu SHRX105MS (30-m length and 0.25-mm inner diameter, part #220-94764-02), and helium was used as the carrier gas. The initial oven temperature was 45 ° C. held for 8 min, followed by ramp to 150 ° C. at 10° C./min. The injection port and detector temperatures were both 200 ° C. The temperature of the ion source (electron ionization mode, 70 eV) was 250 ° C. The MS detector was set at 250 ° C. Samples were run in the SCAN mode over a mass-to-charge (m/z) ratio range of 29-150. Detection at m/z 31 and 45 was used for methanol and ethanol respectively, while fragments at m/z 45, 59, and 60 were analyzed for isopropanol.

Physical Characterization of Hybrid $CuO/Cu_2O$ Arrays. SEM images of the morphology of the copper oxide photocathodes prepared on freshly-cleaned copper were obtained. One of the SEM images was of a "CH 15" sample consisting of nanoribbons of mixed oxide composition ($CuO+Cu_2O$) obtained by sol-gel formation of $Cu(OH)_2$ followed by thermal treatment (15 min) while the other was for a "CH 15/ED 10" sample where nanocrystallites of $Cu_2O$ were electrodeposited on the previously formed copper oxide nanoribbons. It was observed that longer electrodeposition times (>15 min) brought about full coverage of the supporting CuO nanoribbons that reached nanrod shapes, all with similar cylinder diameter. This observation implies that the CuO inner material is completely buried from contact with the electrolyte; thus longer deposition times are not preferred.

As the photocathode in the reactor of Ex. 8 was subjected to continuous electrolyte flow, the CH step was chosen instead of the conventional thermal growth of CuO nanowires from copper foil. In the flow reactor, the necessity for thick and robust nanoribbons to withstand mechanical stress from electrolyte flow (and subsequent peel-off from the substrate) is all the more critical. In fact, the resulting hybrid $CuO/Cu_2O$ nanorod arrays in this study were more densely packed and with each entity having an average diameter in the range 0.3-0.5 µm and a length 6-8 µm.

Figure 15:
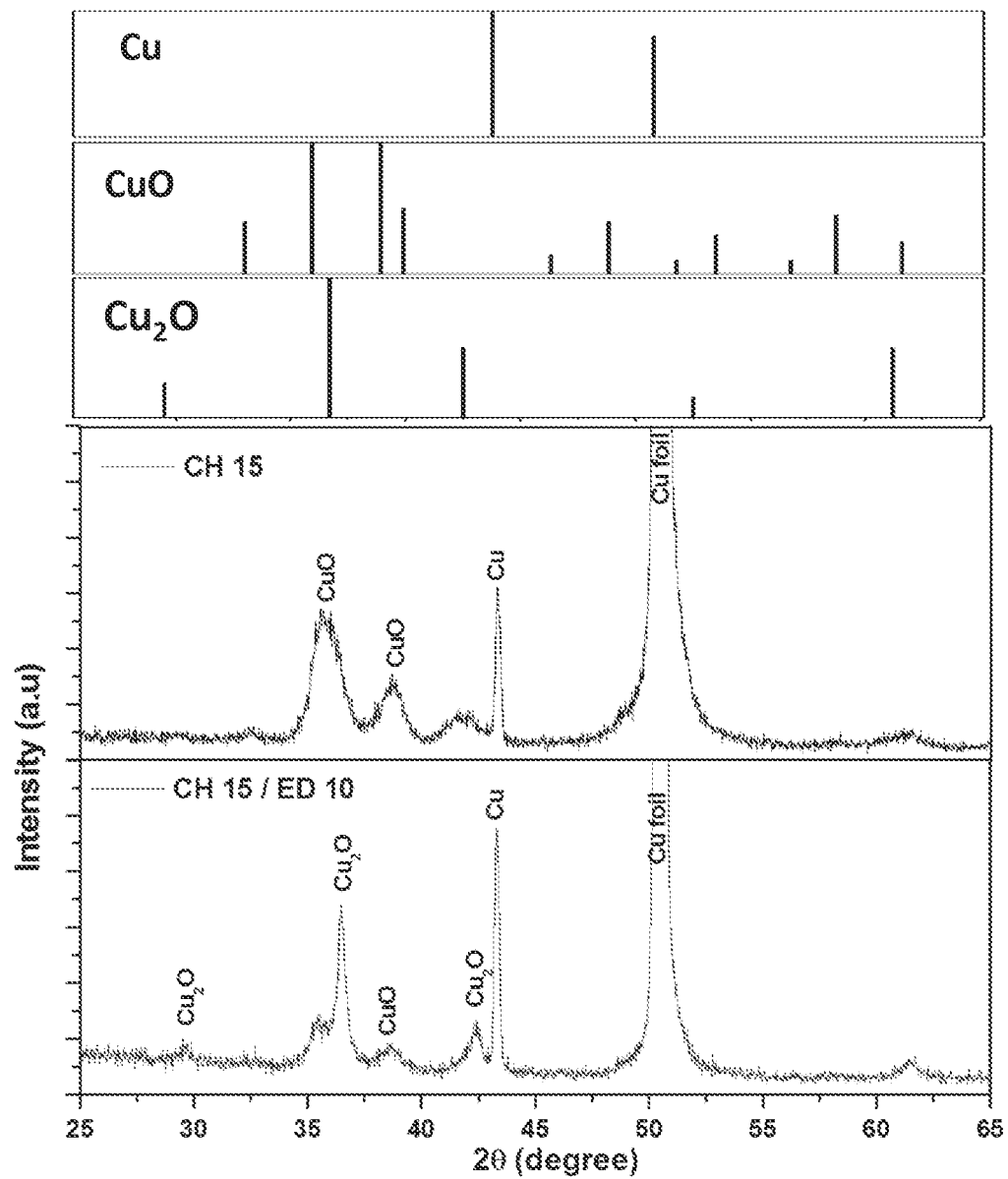
FIG. 15 is an XRD pattern of samples CH 15 (top) and CH 15/ED 10 (bottom). XRD reference patterns for Cu, $Cu_2O$ and CuO are shown at the top of the figure.

FIG. 15 shows the XRD lines for the $CuO/Cu_2O$ hybrid nanorod arrays atop the support CH 15 substrate. The JCPDS reference patterns for CuO (80-1917), $Cu_2O$ (78-2076), and Cu (04-0836) are also provided for comparison in this figure. The CH step followed by thermal anneal at 200° C. for 2 h resulted mainly in the formation of CuO although the underlying copper foil was also detected at $2\theta=50.5°$. The characteristic peaks located at 35.6° and 38.7° can be assigned to reflections from the CuO phase in the dense array of nanoribbons. The XRD pattern of a $CuO/Cu_2O$ hybrid sample (CH 15/ED 10), prepared by post 10 min $Cu_2O$ electrodeposition on a CH 15 film, presented two compounds: $Cu_2O$ and CuO, in addition to signals from the Cu substrate; thus corresponding to electrodeposited $Cu_2O$ nanocrystallites on CuO nanorods. The XRD data thus corroborate the notion from SEM images that the nanocrystallites dispersed on the nanorods are made up of $Cu_2O$.

Figure 16A:
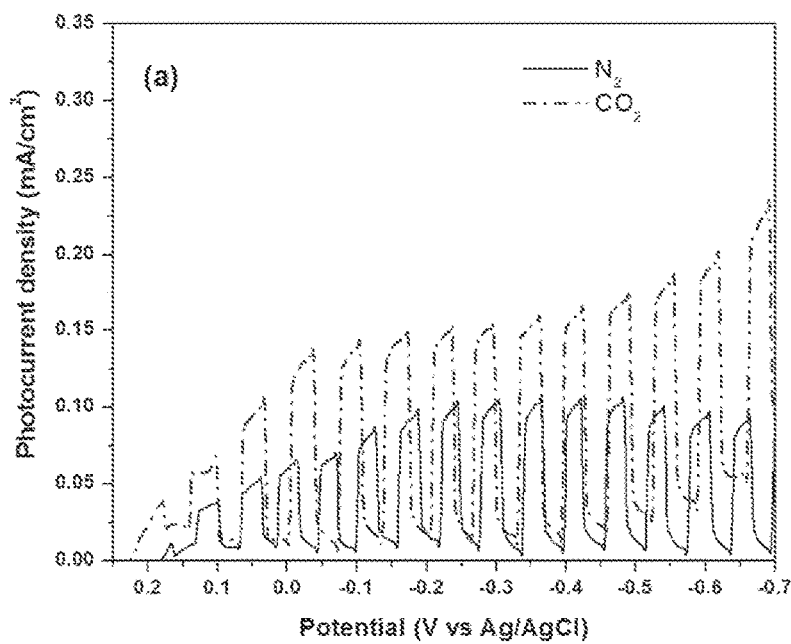
FIGS. 16A-16C: (16A) Comparison of photocurrent/potential profiles for CH 15/ED 10 electrode in 0.1 M $NaHCO_3$ in $N_2$ and $CO_2$ saturated solutions respectively. (16B) Comparison of photocurrent/potential profiles for three samples in 0.1 M $NaHCO_3$ saturated with $CO_2$, and (16C) Photocurrent density of CH 15/ED 10 sample in reactor of Ex. 8 and conventional reactor in $CO_2$-saturated 0.1 M $NaHCO_3$ solution.
Figure 16B:
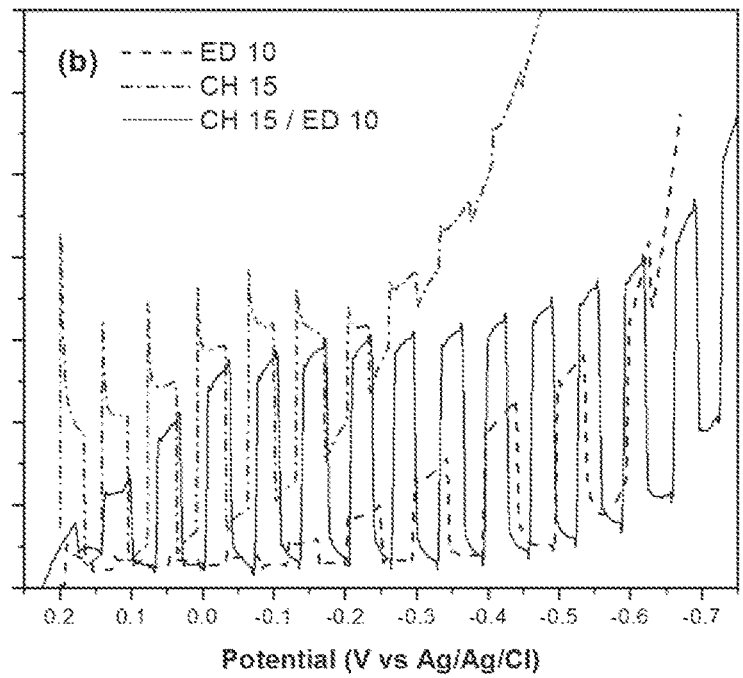

Photoelectroreduction of $CO_2$ using Hybrid $CuO/Cu_2O$ Arrays. FIGS. 16A and 16B contains representative photocurrent density/potential ($i_{ph}/V$) profiles under chopped AM 1.5 simulated solar illumination of the $CuO/Cu_2O$ hybrid films. These profiles depicting photocurrents of cathodic polarity are clearly diagnostic of a p-type photoelectrode behavior in the potential range extending from ~0.2 V to −0.7 V. Specifically, FIG. 16A compares the photoelectrochemical performance of a CH 15/ED 10 film in 0.1 M $NaHCO_3$ saturated with $CO_2$ or in $N_2$ saturated solution respectively. Note that in the presence of $CO_2$, the photocurrent was almost double in the whole potential range (FIG. 16A) pointing to the rather unique capability of $CO_2$ to channel photoelectrons toward it. Specifically, these data confirm that $CO_2$ is a much better electron scavenger than water despite the drastic difference in concentration [~0.03 M for $CO_2$ (see above) vs. 55 M for water)].

The efficacy of our new three-step process for preparation of the hybrid films is clearly shown in FIG. 16B in which the performance of three photocathodes in $CO_2$-saturated 0.1 M $NaHCO_3$ is compared: the hybrid $CuO/Cu_2O$ film, chemically synthesized+thermal annealed sample (CH 15), and an electrodeposited (ED 10) film. The hybrid $CuO/Cu_2O$ sample was found to perform the best for the phototoelectroreduction of $CO_2$ in agreement with the band-edge alignment of both oxide phases. The stabilization role of electrodeposited $Cu_2O$ is also clearly seen in FIG. 16B and is likely rooted in the capability of $Cu_2O$ to adsorb $CO_2$ on its surface. Additionally, these nanorod arrays grown on CuO nanoribbons were more robust and provided higher surface area than those thermally grown on CuO nanowires resulting in their better photoelectrochemical performance.

Figure 16C:
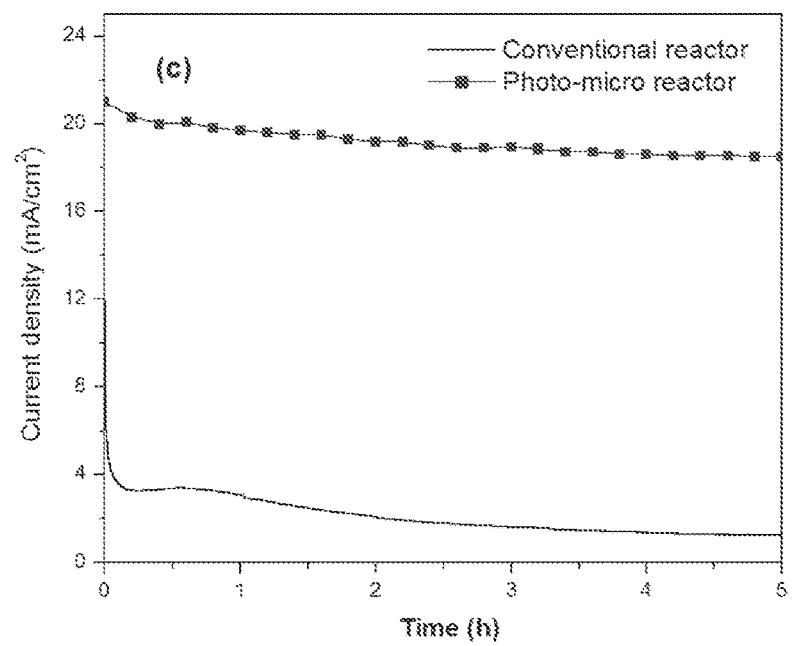

FIG. 16C visually depicts the solar performance of the reactor relative to the batch-type counterpart. Comparison of bulk photoelectrolyses performed at −0.3 V in it and in a conventional photoelectrochemical cell (i.e., without electrolyte flowing in microchannels) indicated that the photocurrent density was ca. 5 times higher for the flow reactor case. As in both cases the photocurrent was normalized by the respective geometric area of the photocathodes, the photocurrent levels in the reactor was not only superior but also more stable over the course of 5 h, indicating that the performance depended not only on the efficiency of the photoelectrode itself but also on the photoreactor configuration and electrode assembly as a whole. In fact, to perform the photoelectrochemical conversion of $CO_2$, both electric field distribution as well as the incoming excitation light flux must be optimized in the photoreactor design (see below).

The enhanced performance of the reactor design of Ex. 8 is also associated with the close spacing (~100 µm) of the electrodes that decreases the voltage drop between them. By contrast, in a conventional (static) electrochemical cell this distance is about a few centimeters. The Ex. 8 reactor incorporates many of the design paradigms inherent in an electrochemical flow detector for liquid chromatography (LC-EC).

Figure 17:
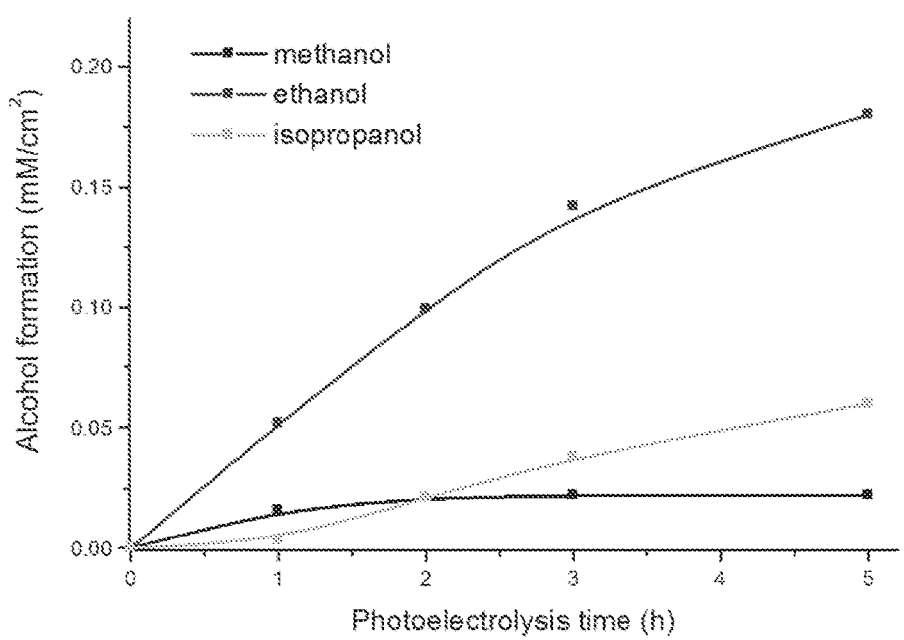
FIG. 17 is a line graph of the total alcohol photogeneration in the reactor of Example 8 (at flow rate=5 mL/h) as a function of time for hybrid CH 15/ED 10 sample polarized at $-0.3$ V vs. Ag/AgCl. Photocathode geometric area=6 $cm^2$. Electrolyte=0.1 M $NaHCO_3$ aqueous solution saturated with $CO_2$.

Enhanced Product Formation. Photoelectrosynthesis of alcohols was demonstrated with the CH 15/ED 10 hybrid photoelectrode. Films prepared with longer electrodeposition times (ED≥15 min) were omitted for reasons outlined earlier. The products formed were followed at constant potential (−0.3 V) and as a function of irradiation time. Thus, FIG. 17 shows formation of three main alcohols: methanol, ethanol and isopropanol, with dominant formation of ethanol as the photoelectrolysis time increases. Contrarily, the same photocathode formulation but performing in a conventional photoelectrochemical cell (i.e., without microchannel flow) showed mainly formation of methanol with minor amounts of ethanol (<10%) at irradiation times higher than 3 h (not shown).

The Faradaic efficiency (FE) values (moles formed/charge passed) for two types of hybrid $CuO/Cu2O$ (TH/ED10 and CH15/ED10) photoelectrodes can be compared under identical photoelectrolysis conditions: the TH/ED10 sample (prepared by thermal formation of CuO nanorods) yielded 85 µM of methanol with a FE of ~94-96% after 90 min of solar irradiation while the new hybrid CH15/ED10 sample generated 160 µM of methanol after 90 min but with a FE of ca. 92%. Even higher performance was found for the Ex. 7 photocathodes and the Ex. 8 reactor for irradiation times of 3 h. The higher performance of CH15/ED10 can be attributed to the higher photoelectrochemically active area associated with more numerous $CuO/Cu2O$ nanorods per unit area (geometric) in this type of electrode vs. the TH/ED10 configuration.

Importantly, the CH15/ED10 photocathode also showed methanol generation in amounts as high as 550 µM after 180 min of irradiation. Besides, the higher photocurrent in the Ex. 8 reactor (FIG. 16C) nicely correlated with the higher amount of photogenerated products totaling ~5-6 times higher than in the conventional photoelectrochemical cell. This corroborates the electrochemical dictum of current flow being tantamount to reaction rate.

Figure 18:
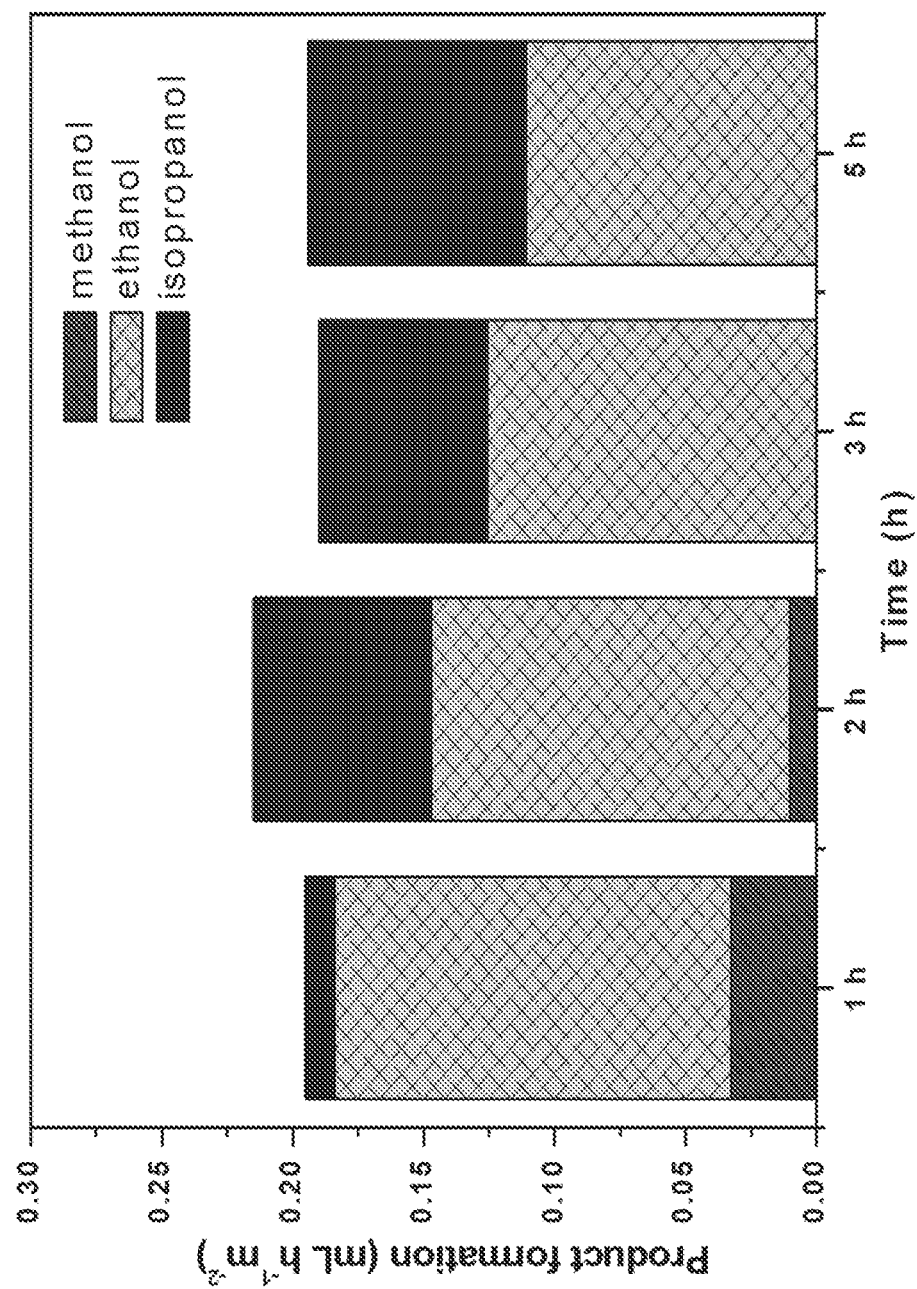
FIG. 18 is a graph of a normalized product distribution in the flow reactor of Example 8 as a function of irradiation time for irradiated CH 15/ED 10 sample at $-0.3$ V. Each bar corresponds to the partial amount of alcohol generated per hour. Other conditions provided in FIG. 17 description above.

To assess the product distribution in the Ex. 8 reactor, FIG. 18 presents a bar diagram of the liquid products (alcohols) formed on a CH15/ED10 film used in the reactor. Note that these data are "dynamic" (rather than cumulative) in that the product is shown in each case as a flux in the flowing electrolyte flow. Also note that the product distribution leads mostly to ethanol and isopropanol as the photoelectrolysis time increases, suggestive of a different photoelectroreduction mechanism takes place in the reactor vis-à-vis the conventional photoelectrochemical cell.

A plausible scenario for the formation of ethanol is that its formation is initiated after some amount of methanol is already formed. Thus, assuming consecutive 2-electron uptake by CO2 (eq. 1-3), products from reactions 1 and 3 react as shown in eq. (4) to generate acetate ions. They in turn can be continuously photoelectroreduced (to ethanol) via another 2-electron uptake step (not shown).

$$CO_2 + 2\ e^- + 1\ H^+ \rightarrow HCOO^- \quad (1)$$

$$HCOO^- + 2\ e^- + 2\ H^+ \rightarrow H_2CO + OH^- \quad (2)$$

$$H_2CO + 2\ e^- + 2\ H^+ \rightarrow CH_3OH \quad (3)$$

$$HCOO^- + CH_3OH \rightarrow CH_3COO^- + H_2O \quad (4)$$

The product distribution was found to change as a function of irradiation time. For example, methanol, ethanol and isopropanol were formed in the first two hours of photoelectrolysis but the photoreaction was driven to preferential formation of higher carbon products for times longer than 3 h. This product distribution shift away from methanol toward longer chain hydrocarbons is rooted, significantly enough, in the formation of C—C bonds.

A liquid alcohol production rate of 0.22 mL/m² h was attained in this study with far from optimized conditions. The above alcohol yield from the reactor was ~6 times higher than batch design studies, and showed longer-chain alcohol products up to $C_2$-$C_3$ (ethanol and isopropanol).

The above specification and examples provide a complete description of the structure and use of an exemplary embodiment. Although certain embodiments have been described above with a certain degree of particularity, or with reference to one or more individual embodiments, those skilled in the art could make numerous alterations to the disclosed embodiments without departing from the scope of this disclosure. As such, the illustrative embodiments of the present photoelectrochemical devices and systems are not intended to be limited to the particular forms disclosed. Rather, they include all modifications and alternatives falling within the scope of the claims, and embodiments other than the one shown may include some or all of the features of the depicted embodiment. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

The invention claimed is:

1. A photoelectrochemical device comprising:
    a cathode chamber comprising:
        a substantially transparent cover;
        a first inlet;
        a first outlet;
        a photocathode comprising a photocatalyst comprising:
            a conducting substrate; and
            a photoactive layer comprising a plurality of nanostructures projecting from the conducting substrate,
        wherein at least one nanostructure comprises an elongated copper (II) oxide (CuO) core having a lateral surface and a top surface, and a plurality of copper (I) oxide ($Cu_2O$) particles deposited on at least a portion of the lateral surface; and
        a first channel partially defined by the transparent cover and partially defined by the photocathode and in fluid communication with the first inlet and the first outlet;
    an anode chamber comprising:
        a conducting member;
        a second inlet;
        a second channel; and
        a second outlet; and
    a proton conducting membrane separating and partially defining a section of the first channel and a section of the second channel.

2. The device of claim 1, wherein the substantially transparent cover and the photocathode form two opposing surfaces.

3. The device of claim 2, wherein the photocathode comprises a first surface, a second surface, and at least one aperture at or near an end opposite from the first inlet, and the first channel is at least partially defined by both the first surface and the second surface.

4. The device of claim 3, wherein a first section of the first channel is partially defined by two opposing surfaces of the substantially transparent cover and the first surface of the photocathode and a second section of the first channel is partially defined by two opposing surfaces of the proton conducting membrane and the second surface of the photocathode.

5. The device of claim 1, wherein the first inlet is configured for gaseous carbon dioxide ($CO_2$) inflow and the first outlet is configured for gaseous outflow comprising one or more alcohols, and the photocathode is porous and extends alongside the proton conducting membrane.

6. The device of claim 5, wherein the first channel is partially defined by a first surface opposing a second surface, the substantially transparent cover comprises the first surface and the photocathode, and the proton conducting membrane comprise the second surface.

7. The device of claim 5, wherein the photocathode is in contact with the proton conducting membrane.

8. The device of claim 1, wherein the CuO core was formed using a sol-gel technique and then heating.

9. The device of claim 1, wherein the conducting substrate is copper.

10. The device of claim 1, wherein the elongated CuO core is a nanorod or nanoribbon.

11. The device of claim 1, wherein the CuO core comprises a width dimension of between 40 nm and 200 nm.

12. The device of claim 1, wherein the CuO core comprises a length between 0.5 and 15 μm.

13. The device of claim 1, wherein the $Cu_2O$ particles form a discontinuous coating on the lateral surface of the elongated CuO core.

14. The device of claim 13, wherein the coating has a thickness of between 30 nm and 100 nm.

15. The device of claim 1, wherein the $Cu_2O$ particles form a continuous coating on at least a portion of the lateral surface of the elongated CuO core.

16. The device of claim 1, wherein at least a portion of the top surface does not have $Cu_2O$ particles deposited thereon.

17. The device of claim 16, wherein the $Cu_2O$ particles are crystallites.

* * * * *